US007929710B2

(12) United States Patent
Iriyama

(10) Patent No.: US 7,929,710 B2
(45) Date of Patent: Apr. 19, 2011

(54) COMMUNICATION SYSTEM FOR REMOTE SOUND MONITORING WITH AMBIGUOUS SIGNAL PROCESSING

(75) Inventor: Tatsuya Iriyama, Hamamatsu (JP)

(73) Assignee: Yamaha Corporation (JP)

( * ) Notice: Subject to any disclaimer, the term of this patent is extended or adjusted under 35 U.S.C. 154(b) by 1394 days.

(21) Appl. No.: 10/938,976

(22) Filed: Sep. 9, 2004

(65) Prior Publication Data

US 2005/0052285 A1 Mar. 10, 2005

(30) Foreign Application Priority Data

Sep. 10, 2003 (JP) ................................ 2003-318957

(51) Int. Cl.
*H04R 29/00* (2006.01)
*H04R 3/00* (2006.01)
*H04M 11/00* (2006.01)

(52) U.S. Cl. ................ 381/58; 381/56; 381/57; 381/59; 381/122; 455/403; 455/407; 455/408; 379/90.01; 379/100.05

(58) Field of Classification Search .................... 379/37, 379/38, 52, 88.13–88.16, 88.18, 90.01–108.02; 381/56–59, 111, 122, 1, 17–19; 600/559, 600/300, 545, 555; 455/403, 421, 405–409
See application file for complete search history.

(56) References Cited

U.S. PATENT DOCUMENTS 4,763,349 A * 8/1988 Siegel et al. .................... 379/38

FOREIGN PATENT DOCUMENTS

JP 2000-307704 A 11/2000
JP 2001-314657 A 11/2001
JP 2002-314707 A 10/2002

OTHER PUBLICATIONS

Notification of Reasons for Rejection issued in corresponding Japanese patent application No. 2003-318957, dated Dec. 11, 2007.

Notification of Reasons for Rejection issued in corresponding Japanese Patent Application No. 2008-223903 dated Jul. 6, 2010 (which is a divisional application of Japanese Patent Application No. 2003-318957).

* cited by examiner

*Primary Examiner* — Devona E Faulk
(74) *Attorney, Agent, or Firm* — Rossi, Kimms & McDowell LLP

(57) ABSTRACT

A communication apparatus is disposed at a target place for use in monitoring of sounds. An input section collects various sounds generated at the target place. The collected sounds contain a first type of sound information which should be monitored and a second type of sound information which should not be monitored. The input section converts the collected sounds into a signal capable of conveying the sound information. A signal processing section processes the signal for creating ambiguous sound information by masking, trimming or modifying the second type of the sound information. A transmission section transmits the processed signal to a remote place, where the sounds are reproduced from the transmitted signal and the first type of the sound information is monitored, while the second type of the sound information is not monitored, since the second type of the sound information is altered to the ambiguous sound information.

18 Claims, 9 Drawing Sheets

COMMUNICATION SYSTEM FOR REMOTE SOUND MONITORING WITH AMBIGUOUS SIGNAL PROCESSING

BACKGROUND OF THE INVENTION

The present invention relates to a communication apparatus and a program for monitoring sound information of a target place and transmitting the sound information to a remote place.

At home, we live our daily lives by feeling the presence of other members of our families in the same room or a nearby room. Also, in a company office, we perform our daily jobs while feeling the presence of staff members in the same room or a nearby room. A sign of presence of other family or staff members, whether we are aware of it or not, plays an important role in our everyday lives. In a company office, for example, a superior can grasp to what extent his or her subordinates are busy according to signs of activity of the subordinates working in a nearby room. A member of the family living with an elderly person can determine whether or not the elderly person is in a normal condition according to a sign in the next room, for example.

In recent years, there are an increasing number of companies that allow their employees to work at home due to the progress and the spread of communication technologies such as the Internet. An increasing number of family members live apart from each other. In the former case under such circumstances, it is difficult for the superior to determine to which extent the subordinates are busy. In the latter case, family members living apart from the elderly person cannot notice if he or she falls in unusual state.

To solve the above-mentioned problems, a possible solution is to install a microphone at a house of an employee working at home or a house of an elderly person living apart from the other family members. An audible sound indicating the state and activity at a target place is detected and transmitted to a remote place where the superior or the other family members are situated. In this case, the superior can audibly and in realtime keep track of elderly person's physical states. The superior can audibly and in realtime grasp employee's activity. However, sometimes the monitoring by sounds is unfavorable because of the possibility of violating the privacy of the person to be monitored.

To solve the above-mentioned problem, a communication system has been proposed comprising a combination of first and second communication terminals as disclosed for example in Japanese Non-examined Patent Publication No. 2002-314707. The first communication terminal monitors other physical quantities than the sound, by using a speed sensor, a touch sensor, an infrared CCD sensor and the like to detect human motions, and transmits detection results. The second communication terminal receives the detection results from the sensors of the first terminal and performs responsive operations such as generating a predetermined sound according to the received detection result.

The above-mentioned communication system of the prior art using the speed sensor or the infrared CCD sensor are generally expensive. Further, since these devices cover only narrow ranges that can be monitored, it is necessary to install a plurality of sensors at different locations in a house for sufficient monitoring. As another example, in the above-mentioned communication system of the prior art using the touch sensor, no information is transmitted to a monitoring party unless a person to be monitored touches the touch sensor.

Such a system cannot be used for the purpose of close and continuous monitoring of state and activity of the target person.

SUMMARY OF THE INVENTION

The present invention has been made in consideration of the foregoing. It is therefore an object of the present invention to provide a communication apparatus capable of inexpensively and easily transmitting remote states for monitoring in realtime basis without violating the privacy.

In order to achieve the above-mentioned object, the present invention provides a communication system for monitoring sounds of a first place at a second place remote from the first place through a communication line. The inventive communication system comprises a first communication apparatus, a second communication apparatus and a signal processing section. The first communication apparatus is disposed at the first place and equipped with an input section for collecting various sounds generated at the first place containing a first type of sound information which should be monitored and a second type of sound information which should not be monitored, and for converting the collected sounds into a signal capable of conveying the sound information, and a transmission section for transmitting the signal to the second place through the communication line. The second communication apparatus is disposed at the second place and equipped with a reception section for receiving the signal transmitted from the first place, and an output section for reproducing the sounds from the received signal. The signal processing section is disposed in either of the first place and the second place or interposed therebetween, and processes the signal for creating ambiguous sound information by masking, trimming or modifying the second type of the sound information, whereby the first type of the sound information is monitored from the reproduced sounds at the second place while the second type of the sound information is not monitored from the reproduced sounds since the second type of the sound information is altered to the ambiguous sound information by the signal processing section. The input section collects the various sounds including a physical noise sound which is associated with activity to be monitored and therefore which is generated as the first type of the sound information, and a speak sound which is incidentally spoken as the second type of the sound information.

When daily life sounds at the first place are transmitted to the second place according to the above-mentioned communication system, specific information such as conversation is not transmitted. It is possible to provide effects of protecting the privacy of a person at the first place.

Further, the present invention provides a first communication apparatus disposed at a target place for use in monitoring of sounds at a remote place through a communication line. The first communication apparatus comprises an input section that collects various sounds generated at the target place, the collected sounds containing a first type of sound information which should be monitored and a second type of sound information which should not be monitored, and that converts the collected sounds into a signal capable of conveying the sound information, a signal processing section that processes the signal for creating ambiguous sound information by masking, trimming or modifying the second type of the sound information, and a transmission section that transmits the processed signal to the remote place, where the sounds are reproduced from the transmitted signal and the first type of the sound information is monitored from the reproduced sounds while the second type of the sound information is not monitored from the reproduced sounds since the second type of the sound information is altered to the ambiguous sound information. The present invention also provides a second communication apparatus disposed at a remote place for use in monitoring of sounds generated at a target place through a communication line, the generated sounds containing a first type of sound information which should be monitored and a second type of sound information which should not be monitored, the generated sounds being collected at the target place and converted into a signal capable of conveying the sound information. The inventive second communication apparatus comprises a reception section that receives the signal from the target place through the communication line, a signal processing section that processes the received signal for creating ambiguous sound information by masking, trimming or modifying the second type of the sound information, and an output section that reproduces the sounds from the processed signal such that the first type of the sound information is monitored from the produced sounds while the second type of the sound information is not monitored from the reproduced sounds since the second type of the sound information is altered to the ambiguous sound information.

This communication apparatus generates a daily life sound that is processed to prevent transmission of specific information such as conversation. It is possible to provide effects of protecting the privacy of a person at the target place generating the daily life sound.

The above-mentioned communication apparatus may be configured to further comprise an operation section operable for inputting instruction information to specify the second type of the sound information which should not be monitored, so that the signal processing section processes the signal based on the instruction information to alter the specified second type of the sound information to the ambiguous sound information.

According to this communication apparatus, a user can select specific sound information from the various sound information included in daily life sounds, so that the selected sound information is not transmitted.

The above-mentioned communication apparatus may be configured to further comprise a memory for storing reference sound information representing reference sounds, such that the signal processing section carries out a calculation process of calculating an index representing similarity between characteristics of the collected sounds conveyed by the signal and characteristics of the reference sounds represented by the stored reference sound information, a determination process of determining whether or not the collected sounds are similar to the reference sounds based on the calculated index, and a control process of controlling at least one of start, stop and manner of creating the ambiguous sound information according to results of the determination process.

This communication apparatus generates and transmits the following sound information out of the diverse sound information contained in daily life sounds: sound information void of specified information such as specific person's conversation and specific words; or sound information comprising only that specified information.

Preferably, in the above-mentioned communication apparatus, the signal processing section has a filter for filtering the signal to create the ambiguous sound information by removing or reducing a particular frequency component of the second type of the sound information.

This communication apparatus removes frequency band components containing such information as conversation from a daily life sound to generate the processed daily life sound so as to prevent transmission of such information as conversation.

Preferably, the transmission section transmits the signal through the communication line having a limited frequency pass band, and the signal processing section includes a pitch shifter for shifting a pitch of the collected sounds so as to fit a frequency of the signal into the limited frequency pass band of the communication line, whereby the first type of the sound information can be conveyed to the remote place for monitoring.

By adopting the pitch shifting technique, the communication apparatus can transmit or receive any frequency band components contained in a daily life sound over a public telephone network or the like that limits frequency bands of conveyable sounds.

Preferably, the above-mentioned communication apparatus further comprises an operation section operable for inputting instruction information to start creating of the ambiguous sound information, so that the signal processing section starts the creating of the ambiguous sound information when the instruction information is inputted.

This communication apparatus can change the normal communication of daily life sounds to the communication of sounds void of specific prohibited information in response to user's requests.

Preferably, the above-mentioned communication apparatus may be configured to further comprise an operation section operable for inputting instruction information to stop creating of the ambiguous sound information, so that the signal processing section stops the creating of the ambiguous sound information when the instruction information is inputted.

This communication apparatus can change the communication of sounds void of specific prohibited information to the normal communication of daily life sounds in response to user's requests.

Preferably, the above-mentioned first communication apparatus may be configured to further comprise a reception section that receives instruction information from the remote place through the communication line, so that the signal processing section starts or stop creating of the ambiguous sound information in response to the instruction information. Alternatively in the second communication apparatus, the reception section receives instruction information from the target place through the communication line, so that the signal processing section starts or stop creating of the ambiguous sound information in response to the instruction information.

Even if a user is present at a place different from the place where sound information is processed, the communication apparatus enables the user to select information that should be excluded from the information contained in daily life sounds for transmission.

Preferably, the above-mentioned first communication apparatus may be configured to further comprise a sensor section that senses change of a physical quantity at the target place, the physical quantity representing a state of the target place and being selected from electricity, light, temperature, sound and pressure, and that provides instruction information when the change of the physical quantity is sensed, so that the signal processing section starts or stops creating of the ambiguous sound information in response to the instruction information. Alternatively in the second communication apparatus, change of a physical quantity is sensed at the target place, the physical quantity representing a state of the target place and being selected from electricity, light, temperature, sound and pressure, and instruction information is transmitted from the target place when the change of the physical quantity is sensed, so that the signal processing section starts or stops creating of the ambiguous sound information when the reception section receives the instruction information from the target place through the communication line.

These communication apparatus eliminate user's manual operations and use the sensor to switch between the normal communication of daily life sounds and the communication of sounds void of specific prohibited information.

The above-mentioned first communication apparatus may be configured to further comprise a sensor section that senses change of a physical quantity observed at the target place, the physical quantity being selected from electricity, light, temperature, sound and pressure, and that provides instruction information when the change of the physical quantity is sensed, so that the transmission section starts or stops the transmitting of the signal in response to the instruction information. Alternatively in the second communication apparatus, change of a physical quantity is sensed at the target place, the physical quantity being selected from electricity, light, temperature, sound and pressure, and instruction information is transmitted to the remote place through the communication line when the change of the physical quantity is sensed, so that the receiving section starts or stops the receiving of the signal in response to the instruction information.

These communication apparatus eliminate user's manual operations and use the sensor to start or stop the communication.

Preferably in the above-mentioned first communication apparatus, the input section samples the collected sounds at a given sampling frequency and quantizes the sampled sounds to generate the signal in the form of digital sound data, and the signal processing section processes the digital sound data to create the ambiguous sound information by lowering the sampling frequency of the digital sound data. Alternatively in the second communication apparatus, the collected sounds are sampled at a given sampling frequency and the sampled sounds are quantized to generate the signal in the form of digital sound data, so that the reception section receives the signal in the form of the digital sound data and the signal processing section processes the received digital sound data to create the ambiguous sound information by lowering the sampling frequency of the digital sound data, By using digital technology, these communication apparatus easily generate the sound information void of prohibited information such as conversation contained in daily life sounds.

Preferably in the above-mentioned first communication apparatus, the input section samples the collected sounds and quantizes the sampled sounds by a given quantization bit number to generate the signal in the form of digital sound data, and the signal processing section processes the digital sound data to create the ambiguous sound information by reducing the quantization bit number. Alternatively in the second communication apparatus, the collected sounds are sampled and the sampled sounds are quantized by a given quantization bit number to generate the signal in the form of digital sound data, so that the reception section receives the signal in the form of the digital sound data and the signal processing section processes the received digital sound data to create the ambiguous sound information by reducing the quantization bit number of the received digital sound data.

By using the digital sound technology, these communication apparatus also easily generate the sound information void of prohibited information such as conversation contained in daily life sounds.

Preferably the above-mentioned first communication apparatus may be configured to further comprise a measurement section that measures at least one of a volume, a pitch and a tone of the collected sounds, so that the signal processing section creates the ambiguous sound information according to the measured volume, pitch or tone of the collected sounds. Alternatively in the second communication apparatus, at least one of a volume, a pitch and a tone of the collected sounds is measured and a measured result is transmitted to the remote place through the communication line, so that the reception section receives the measured result and the signal processing section creates the ambiguous sound information according to the measured result.

These communication apparatus generates sound information from the daily life sounds by using only limited information such as the volume, the pitch, and the quality of sounds. Consequently, the generated sound information can readily preclude the prohibited contents such as conversation included in daily life sounds.

Furthermore, the present invention provides a program executable by a computer equipped at a target place for monitoring of sounds at a remote place through a communication line. The inventive program comprises an input step of collecting various sounds generated at the target place, the collected sounds containing a first type of sound information which should be monitored and a second type of sound information which should not be monitored, and converting the collected sounds into a signal capable of conveying the sound information, a signal process step of processing the signal to create ambiguous sound information by masking, trimming or modifying the second type of the sound information, and a transmission step of transmitting the processed signal to the remote place, where the sounds are reproduced from the transmitted signal and the first type of the sound information is monitored from the reproduced sounds while the second type of the sound information is not monitored from the reproduced sounds since the second type of the sound information is altered to the ambiguous sound information. There is provided another executable by a computer equipped at a remote place for monitoring of sounds generated at a target place through a communication line, the generated sounds containing a first type of sound information which should be monitored and a second type of sound information which should not be monitored, the generated sounds being collected at the target place and converted into a signal capable of conveying the sound information. The inventive program comprises a reception step of receiving the signal from the target place through the communication line, a signal process step of processing the received signal to create ambiguous sound information by masking, trimming or modifying the second type of the sound information, and an output step of reproducing the sounds from the processed signal such that the first type of the sound information is monitored from the produced sounds while the second type of the sound information is not monitored from the reproduced sounds since the second type of the sound information is altered to the ambiguous sound information.

The above-mentioned programs allow a computer to generate daily life sounds that are processed so as not to transfer specific information such as conversation.

The communication apparatus and the program according to the present invention can economically and easily provide a monitoring system that allows users to realtime keep track of states of a remote place without violating the privacy of a person at that place.

BRIEF DESCRIPTION OF THE DRAWINGS

The invention will now be described with reference to certain preferred embodiments thereof and the accompanying drawings, wherein.

DETAILED DESCRIPTION OF THE INVENTION

1. First Embodiment

1.1 Communication System Configuration

Figure 1:
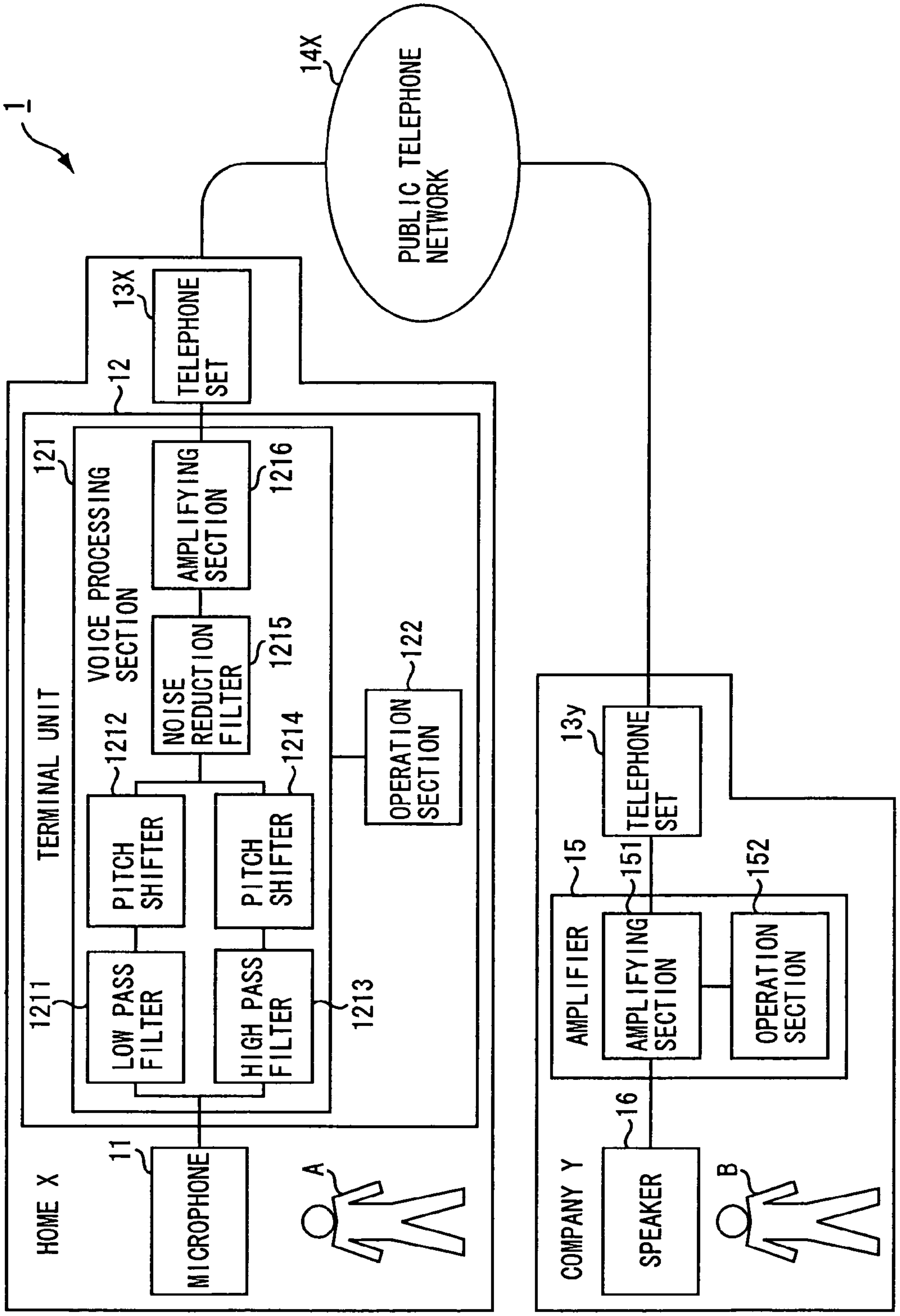
FIG. 1 shows a configuration of the communication system according to the first embodiment of the present invention.

FIG. 1 shows a configuration of a communication system 1 according to a first embodiment of the present invention. The communication system 1 mainly comprises: a microphone 11, a terminal unit 12, and a telephone set 13*x* disposed in a home X of an employee A; and a telephone set 13*y*, an amplifier 15, and a speaker 16 disposed in a company Y where a superior B of the employee A works. The following description assumes that wired connections are used among all components of the communication system 1. However, part or all of the components of the communication system 1 may be connected wirelessly.

The telephone set 13*x* in the home X and the telephone set 13*y* in the company Y have general telephone functions for voice communication via a public telephone network 14. The telephone sets 13*x* and 13*y* have a voice input section and a voice output section as voice input/output means other than a handset. The voice output section is means for receiving a voice signal from a communicating party via the public telephone network 14 and outputting the voice signal to external devices. The voice input section receives a voice signal from an external device and sends the voice signal to the communicating party via the public telephone network 14. In the description to follow, the term "voice" refers to not only a human voice, but also the audible sound in general.

The amplifier 15 in the company Y is a general audio amplifier having an amplifying section 151 and an operation section 152. The amplifying section 151 adjusts levels of voice signals output from the voice output section of the telephone set 13*y* and outputs them to the speaker 16. The operation section 152 has a keypad and the like that accept user operations. A user can use the operation section 152 to turn on or off the amplifying section 151 and adjust its output levels. The speaker 16 is an ordinary speaker and outputs as the sound a voice signal output from the amplifying section 151.

In the home X, the microphone 11 is an ordinary microphone and converts the voice into an analog voice signal (hereafter simply referred to as a voice signal) for output. The terminal unit 12 is a central component for realizing the feature of the present invention in the communication system 1. The terminal unit 12 processes a voice signal input from the microphone 11, removes part of information contained in the input voice signal, and then outputs the processed voice signal to the voice input section of the telephone set 13*x*. The terminal unit 12 comprises a voice processing section 121 and an operation section 122.

For example, the voice processing section 121 has one or more filters and the like as shown below.

(a) Low pass filter 1211 with a cutoff frequency of 400 Hz (b) Pitch shifter 1212 to generate two harmonics (c) High pass filter 1213 with a cutoff frequency of 3.5 kHz (d) Pitch shifter 1214 to generate half harmonics (e) Noise reduction filter 1215

(f) Amplifying section 1216

FIG. 1 shows a configuration example of the voice processing section 121 that uses all of these components. This is only an example. There may be other configurations that lack part of the components.

The above-mentioned filters and the like may use analog circuits or digital circuits. When the voice processing section 121 is configured to comprise the filters and the like using digital circuits, an A/D (Analog to Digital) converter and a D/A (Digital to Analog) converter just need to be added to the terminal unit 12. The A/D converter converts a voice signal output from the microphone 11 into a digital signal. The D/A converter converts a digital signal obtained from the voice processing section 121 into an analog voice signal and outputs it to the voice input section of the telephone set 13*x*.

According to the voice processing section 121 in FIG. 1, the low pass filter 1211 and the high pass filter 1213 constitute means for obtaining a so-called "ambiguous voice". This signal is generated by excluding a signal within frequency bands (400 Hz to 3.5 kHz) equivalent to the human voice from the voice signal collected by the microphone 11. In this manner, given information is removed or hidden from the voice collected by the microphone 11 to produce the ambiguous voice. A voice signal indicating the ambiguous voice is called an "ambiguous voice signal".

A voice signal output from the microphone 11 passes through the low pass filter 1211 to yield a frequency comprising components of 400 Hz or lower. The pitch shifter 1212 doubles this frequency. A voice signal output from the microphone 11 passes through the high pass filter 1213 to yield a frequency comprising components of 3.5 kHz or higher. The pitch shifter 1214 halves this frequency.

The noise reduction filter 1215 is supplied with signals output from the pitch shifters 1212 and 1213. The noise reduction filter 1215 removes noise components from the input signals. For example, a noise component is generated when the microphone collects sounds. Alternatively, a noise component becomes remarkable after filtering of the low pass filter 1211 and the high pass filter 1213. Signals output from the pitch shifters 1212 and 1214 pass through the noise reduction filter 1215 to generate a signal that provides a sound less uncomfortable to listeners.

The amplifying section 1216 amplifies a signal output from the noise reduction filter 1215 to a voice signal for output. The amplified voice signal is then provided with an appropriate level corresponding to a dynamic range and the like for the public telephone network 14.

The above-mentioned configuration is merely an example. The voice processing section 121 can be configured to comprise any other filters and the like and combinations thereof. In this case, the filters and the like need to be able to process a voice signal indicating the voice collected by the microphone 11 and prevent transmission of part of the information included in the collected voice. For example, the voice processing section 121 may comprise a delay circuit that holds an input voice signal approximately 100 ms and then outputs it. It may be preferable to find a difference between the delay output and the input voice signal to obscure a voice indicated by the voice signal. Further, the voice processing section 121 may comprises a tone generator that generates voice signals such as sine waves. It may be preferable to modulate a voice signal generated from the tone generator by reading that signal in accordance with an input voice signal, and then output the modulated signal.

The operation section 122 has a keypad to accept user operations. Using the operation section 122, a user can change parameters for the filters and the like included in the voice processing section 121, modify output levels and the like of the amplifying section 1216, and turn on or off the voice processing section 121.

1.2 Communication System Operations

To use the communication system 1, the employee A or the superior B dials the destination's phone number using the telephone set 13*x* or 13*y* to establish a voice communication connection between the telephone sets 13*x* and 13*y*. The employee A then uses the operation section 122 of the terminal unit 12 to turn on the voice processing section 121. As a result, the voice processing section 121 processes sounds, voices, and the like (hereafter referred to as "daily life sounds") in the home X collected by the microphone 11. The sound is converted into an ambiguous voice signal and is output to the telephone set 13*x*. The employee A listens to the ambiguous voice indicated by the ambiguous voice signal output to the telephone set 13*y* from the handset speaker of the telephone set 13*x*. By doing so, the employee A operates the operation section 122 of the terminal unit 12 to adjust the volume of the ambiguous voice. The telephone set 13*x* transmits the ambiguous voice signal supplied from the terminal unit 12 to the telephone set 13*y* via the public telephone network 14.

There may be an alternative to the method with which the employee A confirms the volume of the ambiguous voice by listening to it generated from the handset speaker of the telephone set 13*x*. For example, the terminal unit 12 may comprise an indication section. The indication section may provide an indicator and the like to indicate levels of ambiguous voice signals output from the terminal unit 12.

In the company Y, the telephone set 13*y* receives the ambiguous voice signal transmitted from the telephone set 13*x* as mentioned above. The handset speaker of the telephone set 13*y* generates the corresponding sound. The superior B confirms that the ambiguous voice is output from the handset speaker. Then, the superior B uses the operation section 152 of the amplifier 15 to turn on the amplifying section 151 of the amplifier 15. As a result, the amplifier 15 is supplied with the ambiguous voice signal received by the telephone set 13*y* from the terminal unit 12. The ambiguous voice signal is amplified by the amplifier 15 and then is output to the speaker 16. Consequently, the superior B can listen to the ambiguous voice also from the speaker 16. By monitoring the ambiguous voice audible from the speaker 16, the superior B uses the operation section 152 of the amplifier 15 to adjust the volume of the ambiguous voice generated from the speaker 16.

Upon completion of the above-mentioned operations, the employee A and the superior B place their telephone sets 13*x* and 13*y* as they were. In this case, the telephone sets 13*x* and 13*y* are respectively connected to the activated terminal unit 12 and the amplifier 15. Therefore, the voice communication connection remains active between the telephone sets 13*x* and 13*y*. The speaker 16 in the company Y always generates the ambiguous voice resulting from the voice collected by the microphone 11 in the home X. This state continues until the employee A or the superior B uses the operation section 122 or 152 to turn off the terminal unit 12 or the amplifier 15.

According to the communication system 1, the superior B can hear sounds generated by actions of the employee A in a remote place. As a result, the superior B can roughly judge whether the employee A is now working something or sleeping, for example. However, the voice processing section 121 of the terminal unit 12 processes voice signals. Consequently, the company Y does not generate the employee A's voices included in daily life sounds at the home X. If partially generated, the voice will not be so clear as to transmit the contents of a conversation represented by the voice. Accordingly, the employee A's privacy is not violated. If the employee A converses with someone, the conversation does not interrupt superior B's work, for example. No similar inconvenience occurs.

As mentioned above, a moderately obscured voice is transmitted between remote places distant from each other. This communication is hereafter referred to as "ambiguous communication". To realize the ambiguous communication, users need such devices other than the terminal unit 12 as the microphone 11, the telephone sets 13*x* and 13*y*, the amplifier 15, and the speaker 16. These devices are already available in companies and houses or are easily available. The terminal unit 12 is configured to be a combination of simply structured filters and the like and can be manufactured at low costs. As a result, users of the communication system 1 are capable the ambiguous communication at low costs.

In order to perform the ambiguous communication, the communication system 1 requires a long time of telephone line connection for voice communication. Therefore, the communication system 1 is especially practical for public telephone networks that can provide unmetered telephone line connection charges for voice communication according to monthly fixed charges and the like.

2. Second Embodiment

Figure 2:
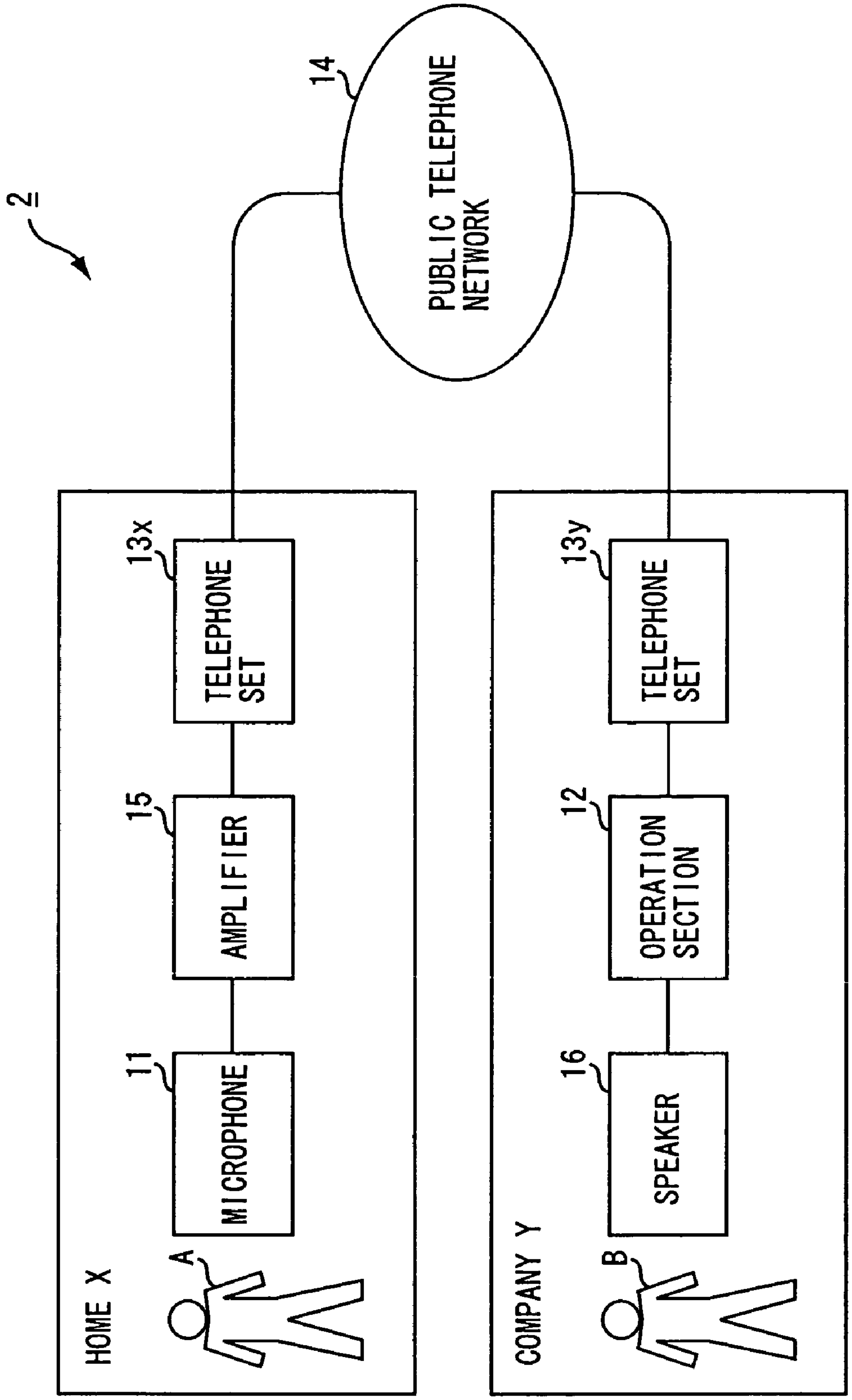
FIG. 2 shows a configuration of the communication system according to the second embodiment of the present invention.

The second embodiment is similar to the above-mentioned first embodiment in many points. The following describes only differences between the second and first embodiments. FIG. 2 shows a configuration of a communication system 2 according to the second embodiment. In the communication system 2, the terminal unit 12 is connected between the telephone set 13*y* and the speaker 16 in the company Y. The amplifier 15 is connected between the microphone 11 and the telephone set 13*x* in the home X.

In the communication system 2, the telephone set 13*x* outputs a voice signal to the telephone set 13*y*. In this case, the voice signal represents unprocessed daily life sounds in the home X. The telephone set 13*y* receives the voice signal. The received voice signal is processed by the terminal unit 12 in the company Y and is converted into an ambiguous voice signal. As a result, the speaker 16 generates an ambiguous voice like the first embodiment.

According to the second embodiment, the receiving party of the ambiguous communication can always use the handset speaker to hear the daily life sound in the home X. In this case, the daily life sound is represented by a voice signal before processed by the terminal unit 12. When sensing an abnormality in the transmitting side of the ambiguous communication, the receiving party of the ambiguous communication can promptly confirm the situation in the transmitting side of the ambiguous communication using the normal clear voice. The second embodiment is especially useful for the following cases. As an example, when a user living alone is absent from home, he or she can monitor the state of his or her home from a remote office and the like. As another example, when family members live apart from an elderly person living alone, they can monitor the state of the home where the elderly person lives.

3. Third Embodiment

Figure 3:
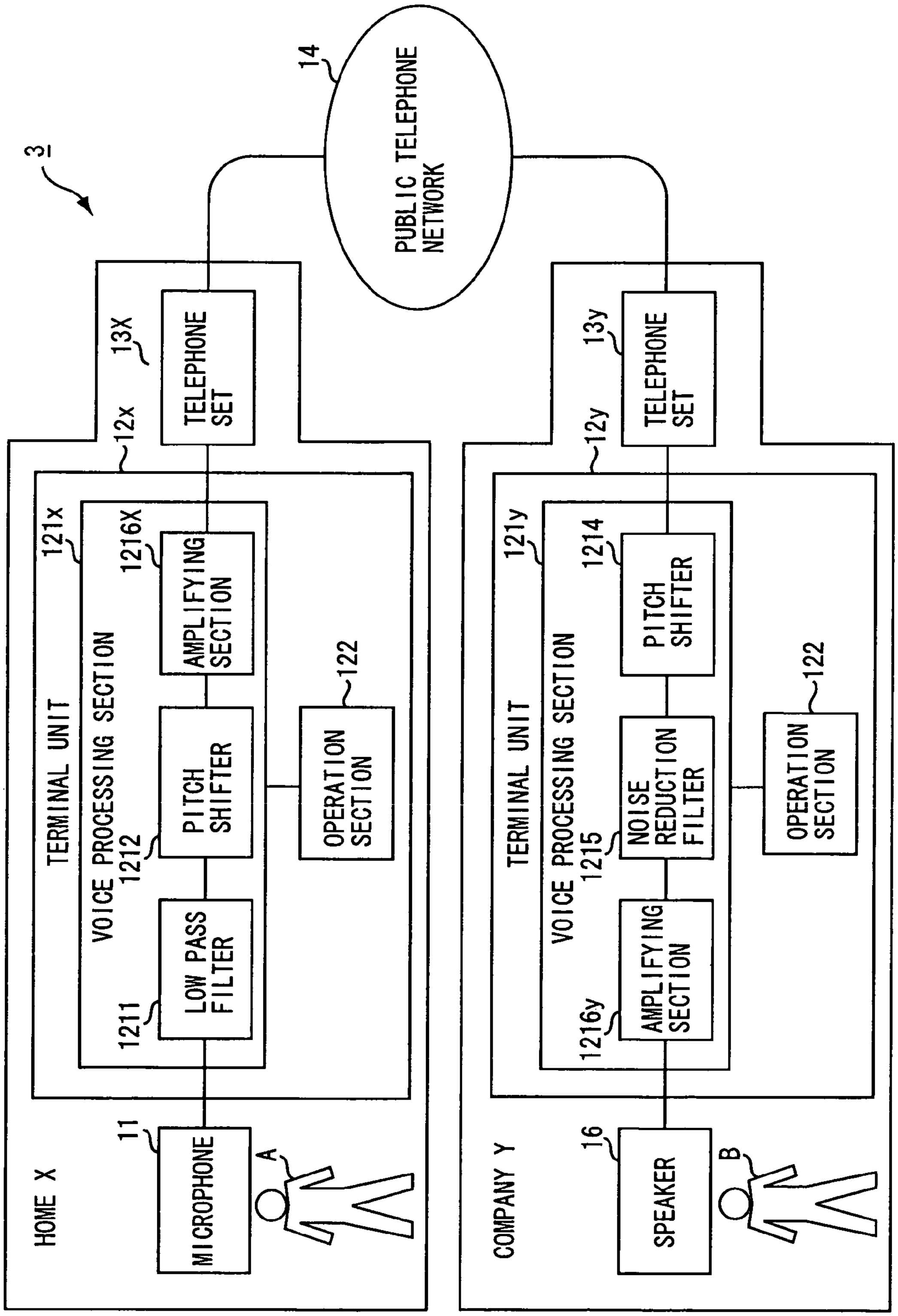
FIG. 3 shows a configuration of the communication system according to the third embodiment of the present invention.

The third embodiment is similar to the above-mentioned first embodiment in many points. The following describes only differences between the third and first embodiments. FIG. 3 shows a configuration of a communication system 3 according to the third embodiment. According to the communication system 3, the terminal unit 12 is connected between the microphone 11 and the telephone set 13*x* in the home X. Another communication apparatus 12 is connected between the telephone set 13*y* and the speaker 16 in the company Y. In the following description, the terminal unit 12 disposed in the home X is referred to as a terminal unit 12*x*. The terminal unit 12 disposed in the company Y is referred to as a terminal unit 12*y*.

The voice processing section 121 of the terminal unit 12*x* comprises a combination of the serially connected filters and the like as follows.

(a) Low pass filter 1211 with a cutoff frequency of 400 Hz (b) Pitch shifter 1212 to generate two harmonics (c) Amplifying section 1216*x*

The voice processing section 121 of the terminal unit 12*y* comprises a combination of the serially connected filters and the like as follows.

(d) Pitch shifter 1214 to generate half harmonics (e) Noise reduction filter 1215

(f) Amplifying section 1216*y*

The above-mentioned configuration of filters and the like is merely an example. The voice processing sections 121 for the terminal units 12*x* and 12*y* may comprise combinations of serially and parallel connected various filters and the like.

According to the third embodiment, the terminal unit 12*x* in the home X extracts signals included in frequency bands of 400 Hz or lower out of the voice signals representing the daily life sound. The terminal unit 12*x* then shifts the extracted voice signals one octave higher and transmits them from the telephone set 13*x* to the telephone set 13*y*. Accordingly, for example, a 400 Hz voice generated in the home X is converted into an 800 Hz voice signal which is then transmitted to the telephone set 13*y*. The voice signal shifted one octave higher is then shifted one octave lower by the terminal unit 12*y* in the company Y. As a result, the voice generated from the speaker 16 partially reproduces the daily life sound in the home X, i.e., the voice contained in frequency bands of 400 Hz or lower. Since the noise reduction filter 1215 is provided for the terminal unit 12*y*, a noise-reduced sound is generated from the speaker 16.

The third embodiment is useful for a case where the public telephone network 14 can transmit voice signals with limited frequency bands, for example. Even if the transmitting side generates the voice signal having a frequency band that cannot be transmitted on the public telephone network 14, the receiving side can reproduce that voice signal at the same pitch as that in the transmitting side or improve the noise reduction effect. The operation section 122 can be configured to be able to change parameters for cutoff frequencies, pitch shift widths, and the like in each of the terminal units 12*x* and 12*y*. When ambiguous voice signals are output to the public telephone network 14 and the speaker 16 in the transmitting and receiving sides of the ambiguous communication, users can adjust the ambiguous voice signals according to users' preferences.

4. Fourth Embodiment

Figure 4:
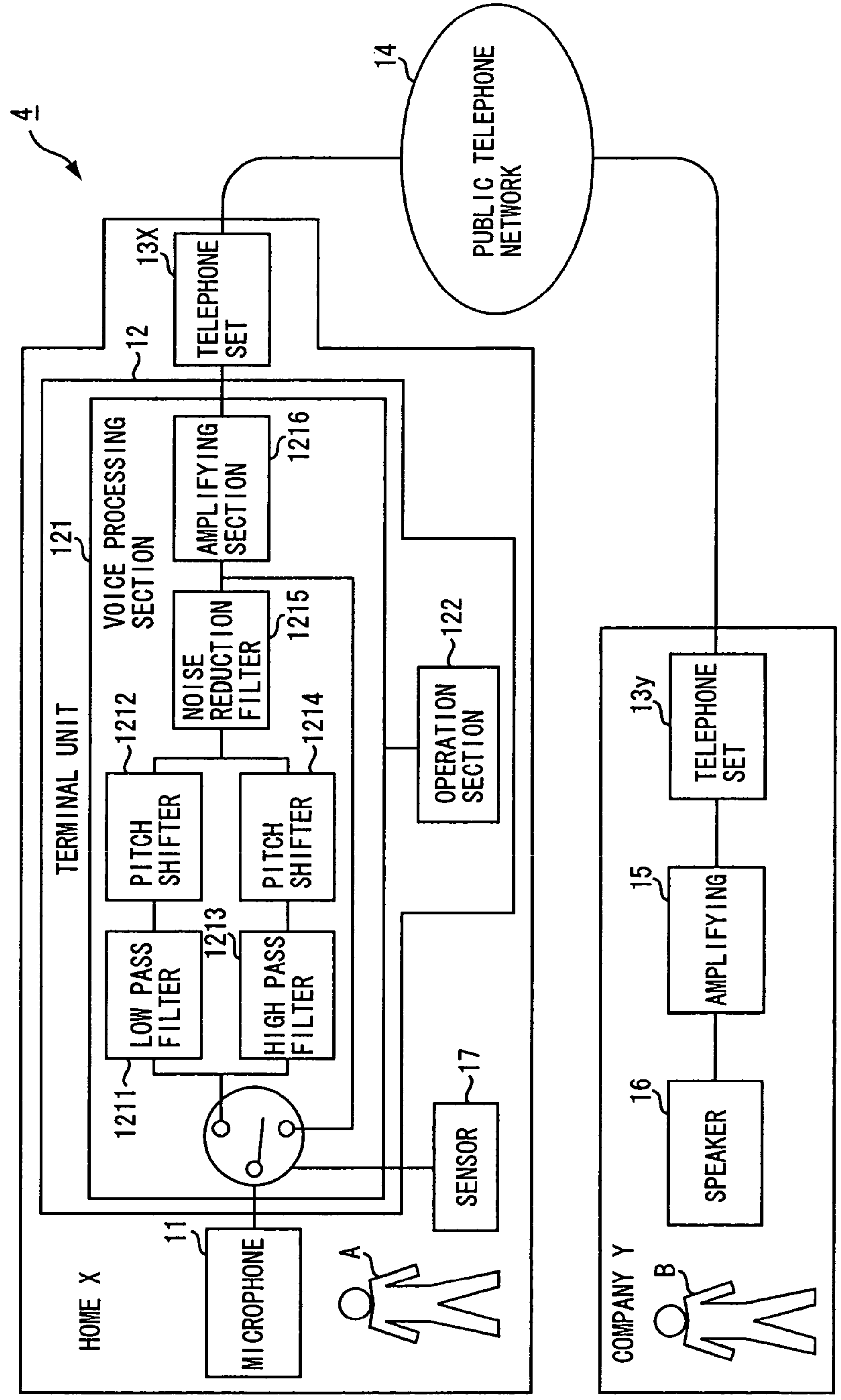
FIG. 4 shows a configuration of the communication system according to the fourth embodiment of the present invention.

The fourth embodiment is similar to the above-mentioned first embodiment in many points. The following describes only differences between the fourth and first embodiments. FIG. 4 shows a configuration of a communication system 4 according to the fourth embodiment. According to the communication system 4, a sensor 17 is connected to the terminal unit 12 disposed in the home X. The voice processing section 121 provided for the terminal unit 12 has a switch that allows a voice signal supplied from the microphone 11 to bypass the filters and the like and to be output to the amplifying section 1216.

The sensor 17 detects whether or not a house dweller exists in the home X. For example, the sensor 17 is characterized as follows.

(a) The sensor has a photodiode and the like and outputs a signal while a room of the home X maintains a specified value or more of the light intensity.

(b) The sensor has an ammeter and the like and outputs a signal while the home X consumes a specified value or more of electric currents.

(c) The sensor is mounted on a door lock and outputs a signal while the door is unlocked.

The above-mentioned sensor is merely an example. The other various sensors are available including such sensor that outputs a signal while detecting motions of persons and things in a room of the home X. The sensor 17 may use analog circuits or digital circuits.

While receiving a signal from the sensor 17, the voice processing section 121 processes a voice signal input from the microphone 11 into an ambiguous voice signal and outputs it to the telephone set 13*x*. While not receiving a signal from the sensor 17, the voice processing section 121 allows a voice signal input from the microphone 11 to bypass the filters and the like and to be output to the telephone set 13*x* only through the amplifying section 1216.

The fourth embodiment is effective for a situation where no user is supposed to be at the transmitting side of the ambiguous communication because no illumination is detected in a room of the home X, for example. In such situation, normal voice communication is performed between the telephone sets 13*x* and 13*y*. As a result, the user can use the ambiguous communication to monitor the state of the communication's transmitting side if someone is present at the communication's transmitting side. On the other hand, the user can use the ordinary voice communication to monitor the state of the communication's transmitting side if no one is present at the communication's transmitting side.

5. Fifth Embodiment

Figure 5:
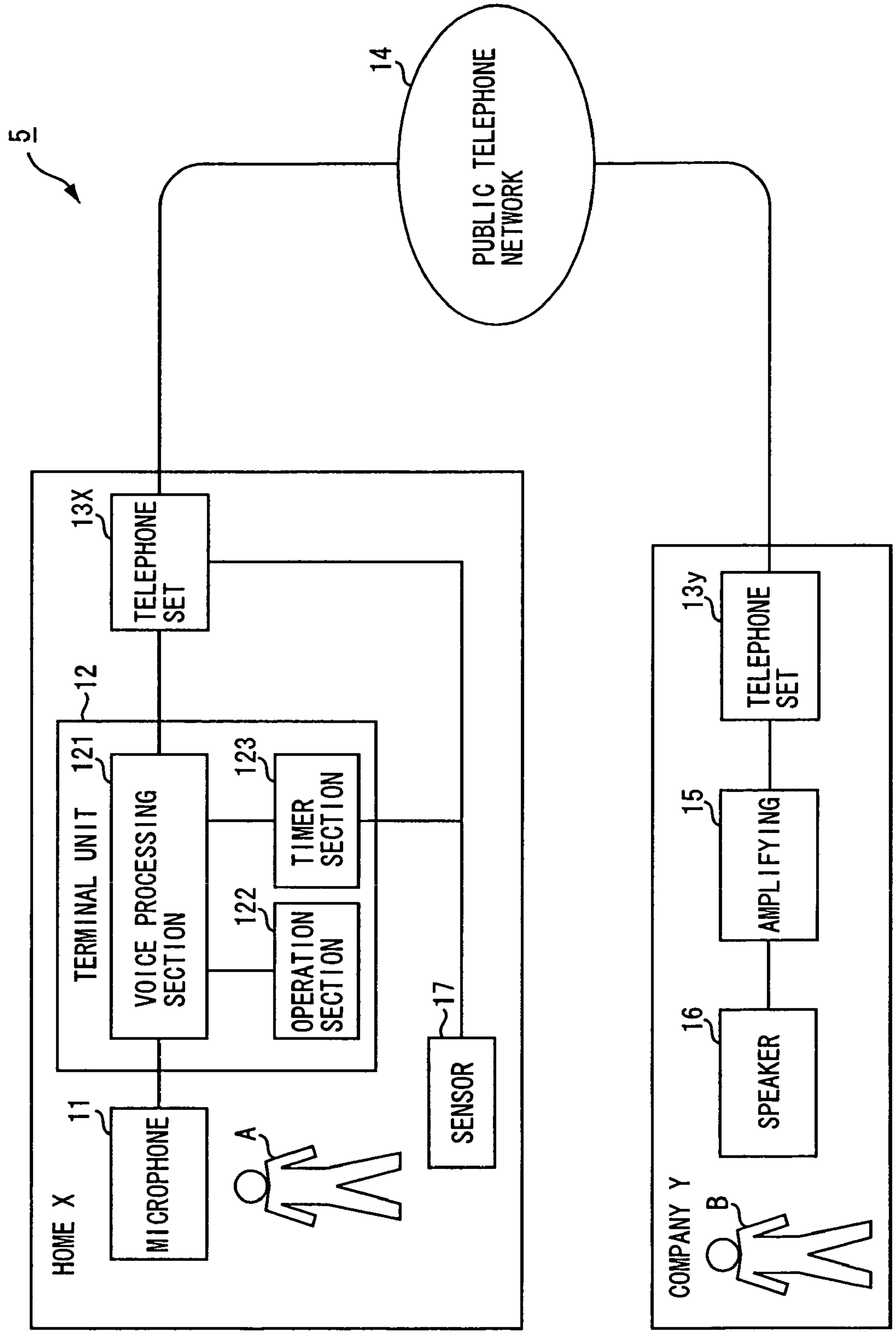
FIG. 5 shows a configuration of the communication system according to the fifth embodiment of the present invention.

The fifth embodiment is similar to the above-mentioned first embodiment in many points. The following describes only differences between the fifth and first embodiments. FIG. 5 shows a configuration of a communication system 5 according to the fifth embodiment. According to the communication system 5, a timer section 123 is provided for the terminal unit 12 disposed in the home X. The sensor 17 is disposed in the home X and is connected to the telephone set 13$x$. In the terminal unit 12, the sensor 17 is also connected to the voice processing section 121 via the timer section 123. The telephone set 13$x$ further comprises an auto dial function.

The sensor 17 is the same as that for the fourth embodiment. When a signal from the sensor changes from off-state to on-state, the telephone set 13$x$ automatically dials a telephone number of the company Y. As a result, a voice communication connection is established between the telephone sets 13$x$ and 13$y$. On the other hand, when a signal received from the sensor 17 via the timer section 123 changes from off-state to on-state, the voice processing section 121 of the terminal unit 12 turns off. As a result, an ambiguous communication starts between the home X and the company Y.

When a signal received from the sensor 17 turns from on-state to off-state, the timer section 123 initializes the timer value to 0 and restarts the timer operation. When a specified timer value is reached, the timer section 123 outputs a signal indicating the communication termination to the voice processing section 121. When receiving the signal indicating the communication termination, the voice processing section 121 turns off. As a result, this removes the voice communication connection established between the telephone set 13$x$ and 13$y$.

The fifth embodiment is effective for a situation where the employee A is supposed to be absent from the home X or to be sleeping because a specified time elapses after the light-off in a room of the home X. In such situation, the ambiguous communication is disconnected automatically. This is useful when the communication using the public telephone network 14 is charged in proportion to the time spent for the voice communication connection. As a result, it is possible to save charges for the time during which there is no need for the ambiguous communication.

6. Sixth Embodiment

Figure 6:
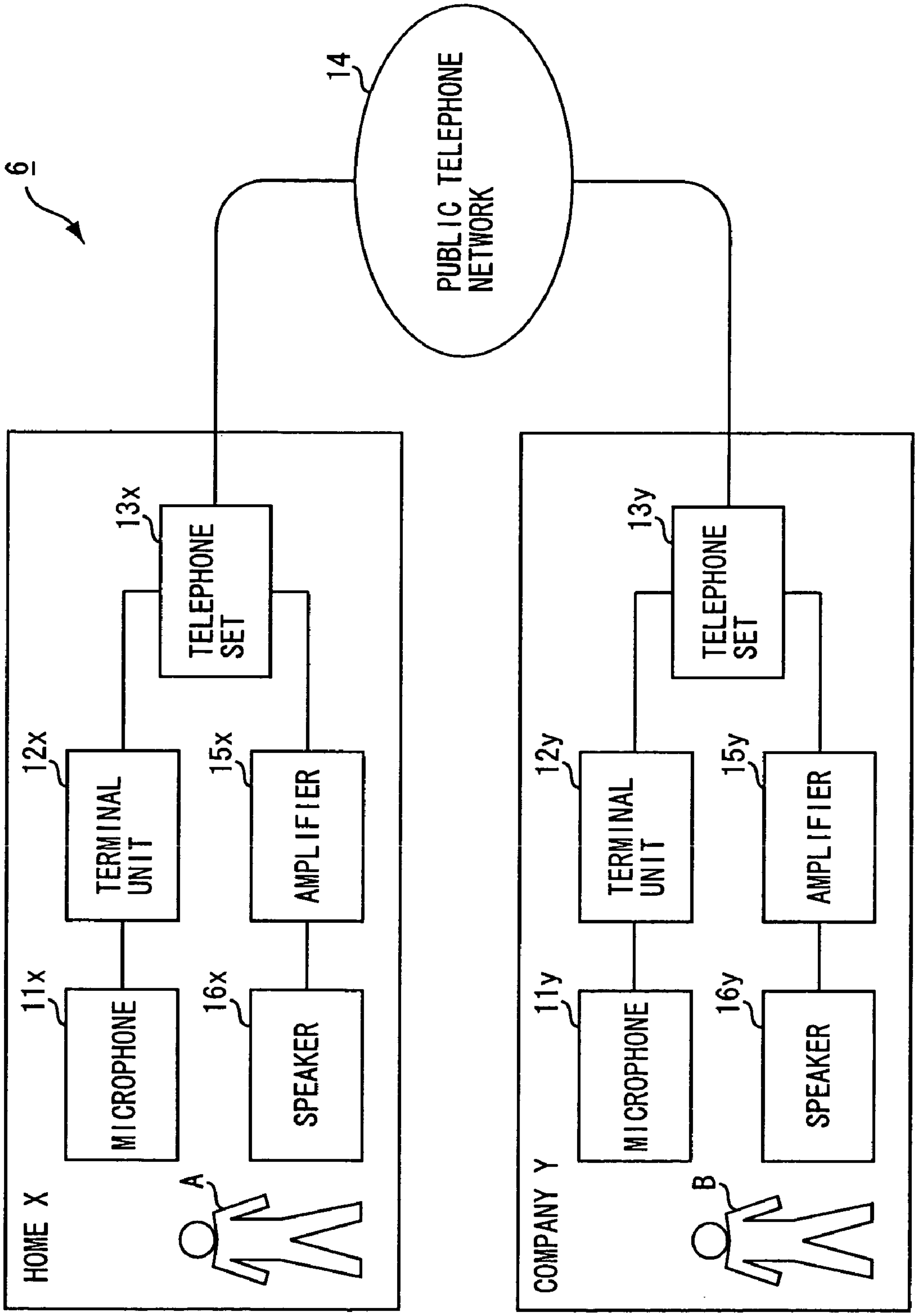
FIG. 6 shows a configuration of the communication system according to the sixth embodiment of the present invention.

The sixth embodiment is similar to the above-mentioned first embodiment in many points. The following describes only differences between the sixth and first embodiments. FIG. 6 shows a configuration of a communication system 6 according to the sixth embodiment. The communication system 6 uses the microphone 11, the terminal unit 12, the amplifier 15, and the speaker 16 in both the home X and the company Y. The microphone 11 and the terminal unit 12 are components for the transmitting side of the ambiguous communication. The amplifier 15 and the speaker 16 are components for the receiving side of the ambiguous communication. In the following description, the reference numerals of these components are suffixed by letters "x" and "y" to indicate the same type of components disposed in the home X and the company Y.

According to the sixth embodiment, the terminal unit 12$x$ converts daily life sounds in the home X into an ambiguous voice signal. The speaker 16$y$ in the company Y generates an ambiguous voice. The terminal unit 12$y$ converts daily life sounds in the company Y into an ambiguous voice signal. The speaker 16$x$ in the home X generates an ambiguous voice. As a result, the bidirectional ambiguous communication is realized between the home X and the company Y.

7. Seventh Embodiment

Figure 7:
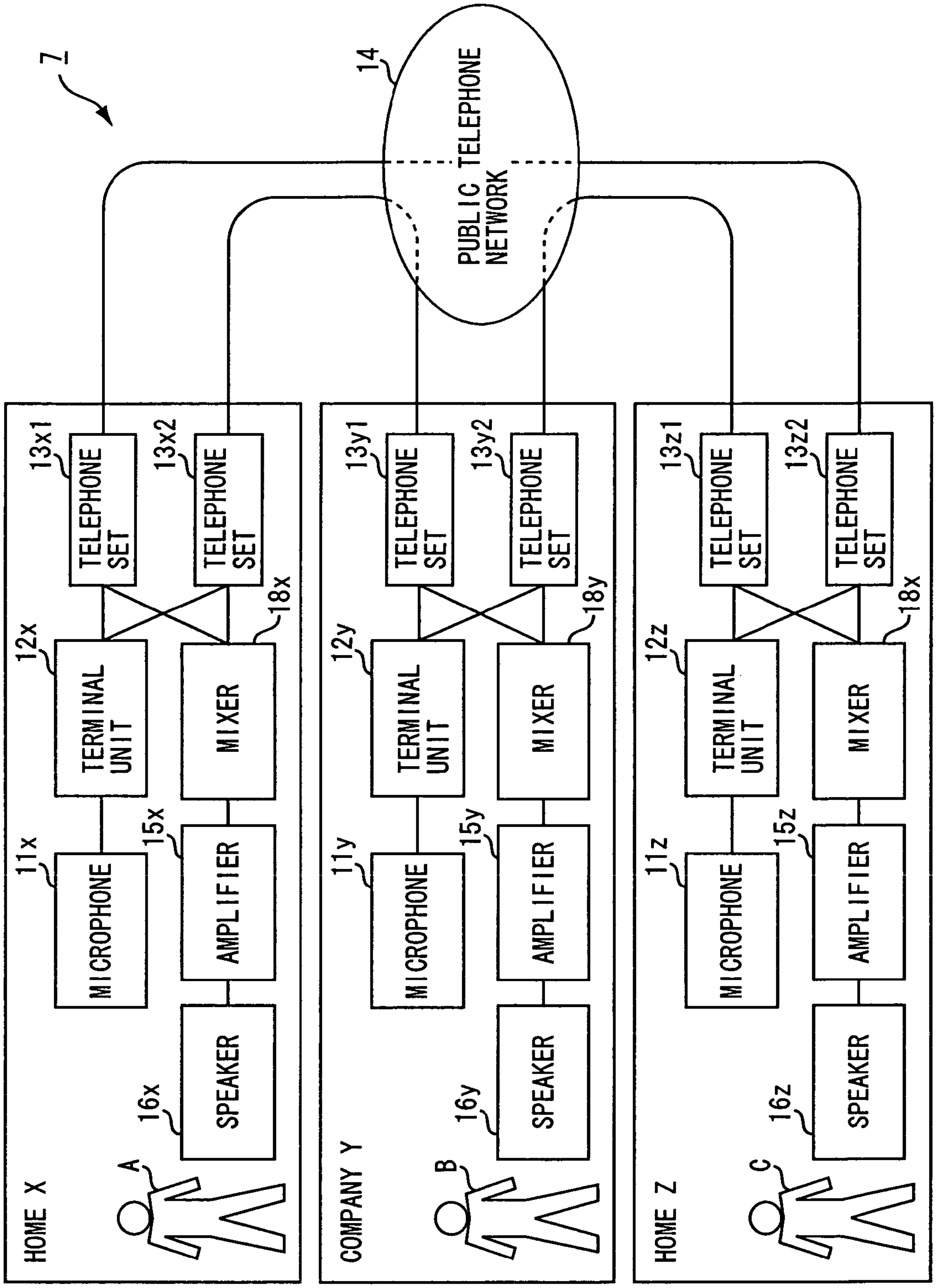
FIG. 7 shows a configuration of the communication system according to the seventh embodiment of the present invention.

The seventh embodiment is similar to the above-mentioned sixth embodiment in many points. The following describes only differences between the seventh and sixth embodiments. FIG. 7 shows a configuration of a communication system 7 according to the seventh embodiment. The communication system 7 permits ambiguous communication not only between the home X and the company Y, but also between the home X and a home Z and between the company Y and the home Z. For example, an employee C works at home like the employee A and lives in a home Z.

Two telephone sets 13 are disposed in each of the home X, the company Y, and the home Z. A mixer 18 is disposed in each of the home X, the company Y, and the home Z. In the following description, the reference numerals of these components are suffixed by letters "x", "y", and "z" to indicate the same type of components disposed in the home X, the company Y, and the home Z. It is necessary to distinguish between two telephone sets 13 disposed in each of the home X, the company Y, and the home Z. For this purpose, the reference numerals of the two telephone sets 13 are further suffixed by "1" and "2" after "x", "y", and "z".

Each voice input section of the telephone set 13 is connected to the terminal unit 12. Each voice output section of the telephone set 13 is connected to the mixer 18. The mixer 18 comprises a plurality of voice input sections and one voice output section. When the voice input section supplies a plurality of voice signals, the mixer 18 adds these signals together. When a voice signal results from the addition, the voice output section outputs the voice signal. The amplifier 15 is connected to the voice output section of the mixer 18.

Each telephone set 13 can establish a voice communication connection with any of the other telephone sets 13 disposed in different places. For example, the following description assumes that the voice communication connection is established between the telephone sets 13$x$1 and 13$z$2, between the telephone sets 13$x$2 and 13$y$1, and between the telephone sets 13$y$2 and 13$z$1, In the home X, for example, the voice output section of the telephone set 13$x$1 outputs an ambiguous voice signal received from the home Z. The voice output section of the telephone set 13$x$2 outputs an ambiguous voice signal received from the company Y.

When two telephone sets 13$x$ output ambiguous voice signals, a mixer 18$x$ adds these signals together. The resulting signal is output to an amplifier 15$x$. As a result, a speaker 16$x$ generates ambiguous voices transmitting states of both the home Z and the company Y. Likewise, a speaker 16$y$ generates ambiguous voices transmitting states of both the home X and the company Z. A speaker 16$z$ generates ambiguous voices transmitting states of both the home X and the company Y.

According to the seventh embodiment, the ambiguous communication may be performed in not only three locations, but also four locations or more. In this case, any combination of locations may be selected for the ambiguous communication. Each of the ambiguous communications may be bidirectional or unidirectional. The seventh embodiment allows a user to monitor states of a plurality of remote places at a time by means of ambiguous voices.

8. Eighth Embodiment

8.1 Communication System Configuration

The above-mentioned first through seventh embodiments mainly use analog voice signals for voice information transmitted from the transmitting side to the receiving side of the ambiguous communication. On the contrary, the eighth embodiment to be described below mainly uses digital voice data for voice information transmitted from the transmitting side to the receiving side of the ambiguous communication.

Figure 8:
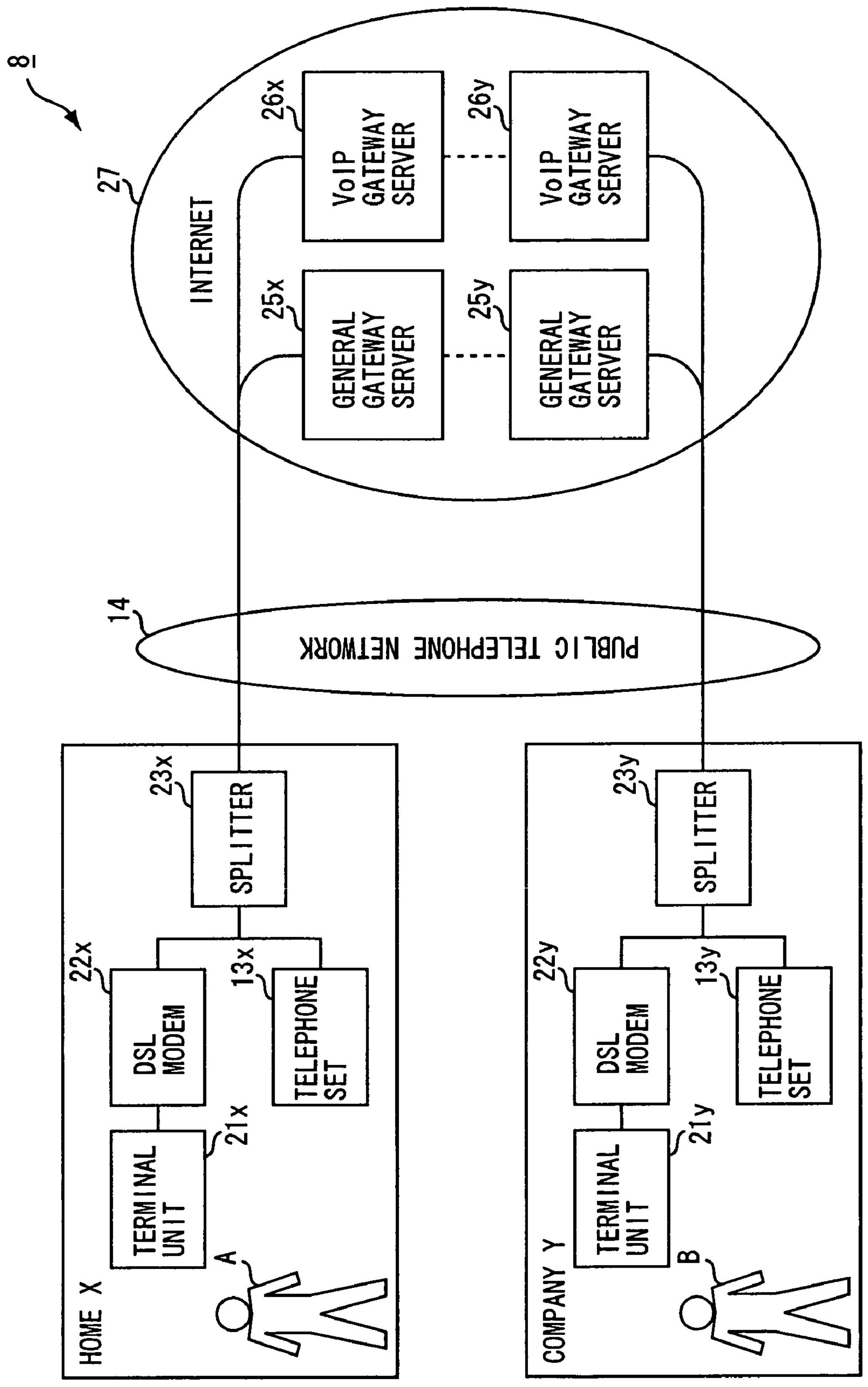
FIG. 8 shows a configuration of the communication system according to the eighth embodiment of the present invention.

FIG. 8 shows a configuration of a communication system 8 according to the eighth embodiment. The communication system 8 provides the employee A's home X and the company Y each with one set of a terminal unit 21, a DSL (Digital Subscriber Line) modem 22, and a splitter 23 connected in this order. In the following description, the reference numerals of these components are suffixed by letters "x" and "y" to indicate the same type of components disposed in the home X and the company Y. The splitter 23 connects with the telephone set 13 as well as the DSL modem 22.

The terminal unit 21 comprises a microphone, an A/D converter, a D/A converter, an amplifier, a speaker, and the like. When a voice signal is obtained from the microphone, the terminal unit 21 uses the A/D converter to convert this voice signal into voice data. The terminal unit 21 processes the voice data to generate "ambiguous voice data", i.e., voice data representing the ambiguous voice. Further, the terminal unit 21 can interchange packet data with other communication devices via a data communication network.

The terminal unit 21 can be also realized by allowing a general-purpose computer to perform processes according to a specific program. The following description assumes that the terminal unit 21 is realized by allowing a general-purpose computer to perform a program for terminal units in the communication system 8. The general-purpose computer comprises a CPU (Central Processing Unit), a DSP (Digital Signal Processor), ROM (Read Only Memory), RAM (Random Access Memory), an HD (Hard Disk), a display section, an operation section, an NW (Network) input/output section, a microphone, an A/D converter, a D/A converter, an amplifier, and a speaker.

Instead of comprising the microphone, the amplifier, the speaker, and the like, the general-purpose computer to realize the terminal unit 21 may be connected to the microphone, the amplifier, and the like via a voice signal input/output interface. Instead of comprising the A/D converter, the D/A converter, and the like, the general-purpose computer to realize the terminal unit 21 may be connected to a digital microphone containing the A/D converter, a digital amplifier containing the D/A converter, and the like via a voice data input/output interface.

The DSL modem 22 receives an analog signal from the splitter 23 and converts the received analog signal into digital data. The splitter 23 is connected to the Internet 27 via the public telephone network 14. The splitter 23 receives an analog signal from the public telephone network 14 and splits the received analog signal into a signal of low-frequency band and a signal of high-frequency band. An analog signal contained in the low-frequency band represents voice. An analog signal contained in the high-frequency band represents data. The splitter 23 outputs the analog signal representing voice to the telephone set 13. The splitter 23 outputs the analog signal representing data to the DSL modem 22. Further, the splitter 23 receives an analog signal of low-frequency band representing voice from the telephone set 13. The splitter 23 receives an analog signal of high-frequency band representing data from the DSL modem 22. The splitter 23 adds both signals and outputs a resultant signal to the public telephone network 14.

The Internet 27 is a group of communication networks connected to each other based on the Internet protocol. The Internet 27 includes a general gateway server 25*x*, a VoIP (Voice over Internet Protocol) gateway server 26*x*, a general gateway server 25*y*, and a VoIP gateway server 26*y*. The general gateway server 25*x* and the VoIP gateway server 26*x* are capable of communication connection with the splitter 23*x*. The general gateway server 25*y* and the VoIP gateway server 26*y* are capable of communication connection with the splitter 23*y*.

When the terminal unit 21 interchanges data with the other communication devices via the Internet 27, the general gateway server 25 and the VoIP gateway server 26 convert communication protocols and relay data. The general gateway server 25 according to the embodiment relay various control data such as instructions to change sound volumes and the like exchanged between the terminal units 21*x* and 21*y*. The VoIP gateway server 26 relay packet data including voice data exchanged between the terminal units 21*x* and 21*y*. In the following description, the VoIP gateway server 26 relays packet data including voice data, i.e., uncompressed PCM (Pulse Code Modulation) data characterized by the 8 kHz sampling frequency and quantifying bit number 8, for example.

In the following description, the communication system 8 realizes the eighth embodiment by transmitting and receiving packet data for the digital data communication via the Internet using the DSL technology as mentioned above. The communication system 8 may be configured to perform the other forms of digital data communication. For example, the communication system 8 may be configured so that the terminal units 21*x* and 21*y* are connected to each other for communication via a leased line. The following description assumes that wired connections are used among all components of the communication system 8. However, part or all of the components of the communication system 8 may be connected wirelessly.

8.2 Communication System Operations

To use the communication system 8, the employee A and the superior B operate the terminal units 21*x* and 2*y* to establish voice communication connection via the VoIP gateway servers 26*x* and 26*y*. The known VoIP technology is used for operations to establish the voice communication connection by exchanging packet data between the terminal units 21*x* and 21*y* and a detailed description is omitted for simplicity.

The terminal unit 21*x* transmits packetized voice data (hereafter referred to as "transmitted voice data"). The employee A operates the operation section of the terminal unit 21*x* to instruct the terminal unit 21*x* to start processing the transmitted voice data. The terminal unit 21*x* is supplied with voice data from the microphone and the A/D converter. In accordance with the employee A's instruction to start processing the voice data, the terminal unit 21*x* processes the voice data in a manner similar to processes of the filters and the like of the voice processing section 121 as shown in FIG. 1, for example. In this manner, the terminal unit 21*x* generates ambiguous voice data. Instead of using the filters and the like comprising analog circuits, the terminal unit 21*x* allows the DSP to perform data processing to realize an IIR (Infinite Impulse Response) filter or an FIR (Finite Impulse Response) filter. Increasing or decreasing PCM data values to realize the amplifying section.

As a result of the above-mentioned process, the terminal unit 21*x* transmits ambiguous voice data to the terminal unit 21*y*. The speaker of the terminal unit 21*y* generates the ambiguous voice. As a result, the ambiguous communication is realized like the first embodiment using the home X as the transmitting side and the company Y as the receiving side. The eighth embodiment also makes it possible to monitor states of remote places without violating the privacy of persons in the remote places by using general-purpose computers and the like normally available to ordinary houses, companies, and the like.

According to the eighth embodiment, the superior B in the company Y can operate the terminal unit 21*y* to instruct the terminal unit 21*x* in the home X to start or stop processing voice data, and change various parameters used for voice data processing. While the ambiguous communication takes place, the superior B uses the operation section of the terminal unit 21$y$ to stop processing the voice data, for example. In response to the superior B's operation, the terminal unit 21$y$ generates data (hereafter referred to as "termination data") for instructing termination of the voice data processing. The terminal unit 21$y$ then transmits the termination data to the terminal unit 21$x$. The termination data is transmitted to the terminal unit 21$x$ via the general gateway server 25. When receiving the termination data, the terminal unit 21$x$ stops the voice data processing so far such as filtering. Thereafter, the terminal unit 21$x$ transmits unprocessed voice data to the terminal unit 21$y$. As a result, this stops the ambiguous communication between the home X as the transmitting side and the company Y as the receiving side. An ordinary voice communication starts between the home X and the company Y. Likewise, the superior B can instruct the terminal unit 21$x$ to start processing voice data or change parameters used for the voice data processing such as cutoff frequencies of the low pass filter.

8.3 Modifications

The above-mentioned eighth embodiment can be variously modified as will be described below within the technological spirit and scope of the present invention. Adding necessary modifications to the communication system 8 according to the eighth embodiment can realize a communication system having functions equivalent to those of the communication systems according to the above-mentioned second to seventh embodiments.

For example, the terminal unit 21$x$ may be configured not to process voice data using the filters and the like. Instead, the terminal unit 21$y$ may be configured to process data that is received (hereafter referred to as "received voice data"). In this manner, it is possible to realize a communication system having the function equivalent to that of the communication system 2 according to the second embodiment. Both terminal units 21$x$ and 21$y$ may be configured to process voice data. In this manner, it is possible to realize a communication system having the function equivalent to that of the communication system 3 according to the third embodiment.

The terminal unit 21$x$ may connect with a sensor equivalent to the sensor 17. In response to signals input from the sensor, the terminal unit 21$x$ is allowed to select whether or not to process voice data, or dial the telephone number of the company Y. In this manner, it is possible to realize a communication system equivalent to the communication system 4 or 5 according to the fourth or fifth embodiment. The terminal unit 21$x$ may be configured to process voice data representing daily life sounds in the home X. The terminal unit 21$y$ may be configured to process voice data and transmit processed ambiguous voice data as packetized data. In this manner, it is possible to realize a communication system equivalent to the communication system 6 according to the sixth embodiment.

The terminal units 21$x$ and 21$y$ may be configured to establish the voice communication connection with the other terminal units via the VoIP gateway server 26. In this manner, it is possible to realize a communication system equivalent to the communication system 7 according to the seventh embodiment.

9. Ninth Embodiment

The ninth embodiment is similar to the above-mentioned eighth embodiment in many points. The following describes only differences between the ninth and eighth embodiments. According to the ninth embodiment, the terminal unit 21 to process voice data generates ambiguous voice data by decreasing the sampling frequency of unprocessed voice data. For example, let us assume that the terminal unit 21$x$ is disposed at the transmitting side of the communication and is configured to process voice data. The terminal unit 21$x$ extracts data corresponding to each sampling (hereafter referred to as "sample data") every several pieces of voice data that contains the sample data. The terminal unit 21$x$ transmits the extracted data as voice data to the terminal unit 21$y$ without processing the extracted data by means of filtering and the like.

For example, let us assume that the terminal unit 21$x$ extracts sample data every ten pieces of unprocessed voice data at a sampling frequency of 8 kHz. The voice data becomes a sequence of extracted sample data at the sampling frequency of 800 Hz. The sampling frequency is reduced from 8 kHz to 800 Hz. Out of spectra contained in the original voice data, a fold-over noise occurs due to a spectrum in the frequency band higher than 400 Hz, i.e., a half of the sampling frequency of 800 Hz. The obtained ambiguous voice is quite different from the original voice and is generated from the speaker of the terminal unit 21$y$. According to the ninth embodiment, the terminal unit 21$x$ can generate ambiguous voice data more easily than performing filtering and the like. Further, the ninth embodiment decreases the amount of voice data exchanged during the ambiguous communication.

10. Tenth Embodiment

The tenth embodiment is similar to the above-mentioned eighth embodiment in many points. The following describes only differences between the tenth and eighth embodiments. According to the tenth embodiment, the terminal unit 21 to process voice data decreases the quantifying bit number for unprocessed voice data to generate ambiguous voice data. For example, let us assume that voice data is processed by the terminal unit 21$x$ disposed at the transmitting side of the communication. The terminal unit 21$x$ extracts four bits from the MSB (Most Significant Bit) of each sample data contained in the voice data. The terminal unit 21$x$ transmits the extracted data as voice data to the terminal unit 21$y$ without processing the extracted data by means of filtering and the like.

Since a very narrow dynamic range is attributed to voice data with the quantifying bit number 4 as mentioned above, the voice data can just approximately reproduce voice waveforms. Accordingly, the speaker of the terminal unit 21$y$ generates an ambiguous voice. According to the tenth embodiment like the ninth embodiment, the terminal unit 21$x$ can generate ambiguous voice data more easily than performing filtering and the like. Further, the tenth embodiment decreases the amount of voice data exchanged during the ambiguous communication.

11. Eleventh Embodiment

The eleventh embodiment is similar to the above-mentioned eighth embodiment in many points. The following describes only differences between the eleventh and eighth embodiments. According to the eleventh embodiment, the terminal unit 21 to process voice data removes only human voice from the voice data to generate ambiguous voice data.

For example, let us assume that voice data is processed by the terminal unit 21$x$ disposed at the transmitting side of the communication. The HD of the terminal unit 21$x$ stores "reference spectrum data", i.e., data indicating an average value for spectrum components of phonemes previously uttered by a plurality of persons. The terminal unit 21$x$ obtains unprocessed voice data via the microphone and the A/D converter. The terminal unit 21$x$ sequentially selects the unprocessed voice data, for example, in time units of 10 milliseconds to generate "target spectrum data", i.e., data indicating a spectrum component of the selected voice data.

The terminal unit 21*x* then calculates a correlation coefficient as an index indicating the similarity between target spectrum data and reference spectrum data corresponding to each phoneme. The terminal unit 21*x* determines whether or not the calculated correlation coefficient exceeds a specified value. The specified value is configured to range from 0 to 1. The specified value is adjusted to be smaller than a correlation coefficient calculated by using the target spectrum data generated from voice data containing human voice. The specified value is adjusted to be larger than a correlation coefficient calculated by using the target spectrum data generated from voice data not containing human voice.

As mentioned above, the terminal unit 21*x* determines the correlation coefficient between the target spectrum data and the reference spectrum data corresponding to any of phonemes. If the correlation coefficient exceeds the specified value, the terminal unit 21*x* subtracts the reference spectrum data from the target spectrum data to obtain a spectrum component. The terminal unit 21*x* superposes the spectrum component to generate voice data and transmits the generated voice data to the terminal unit 21*y*. On the other hand, the correlation coefficient between the target spectrum data and the reference spectrum data may not exceed the specified value with respect to the reference spectrum data corresponding to any phonemes. In such case, the terminal unit 21*x* directly transmits the previously selected voice data to the terminal unit 21*y*.

According to the process as mentioned above, the terminal unit transmits the voice data to the terminal unit 21*y*. This voice data is ambiguous voice data indicating the voice obtained by eliminating voice components uttered by typical persons from the unprocessed voice containing the human voice. The terminal unit 21*x* uses the method of comparing a phoneme-based spectrum component with another spectrum component of the target voice data to specify and eliminate voice data of the voice containing the human voice. The present invention is not limited thereto. Another technology may be used such as a blind sound source separation algorithm based on the independent component analysis.

The reference spectrum data may be generated not only from voices uttered by a plurality of persons, but also from voices uttered by a single person. In this case, the speaker for the receiving side of the communication generates an ambiguous voice obtained by eliminating only the voice uttered by a specific person from the daily life sound for the transmitting side of the communication.

The eleventh embodiment clearly transmits, to the receiving side, the daily life sound except voices uttered by specific or all persons at the transmitting side of the ambiguous communication. A receiving party can know states of the transmitting side in more detail.

12. Twelfth Embodiment

The twelfth embodiment is similar to the above-mentioned eighth embodiment in many points. The following describes only differences between the twelfth and eighth embodiments. According to the twelfth embodiment, the terminal unit 21 to process voice data processes the voice data containing a specific voice so as not to convert that specific voice into an ambiguous voice.

For example, let us assume that voice data is processed by the terminal unit 21*x* disposed at the transmitting side of the communication. Specific voices may need to be excluded from being processed into ambiguous voices. Such unwanted voices are divided, for example, every 10 milliseconds into data representing the respective spectrum components. The HD of the terminal unit 21*x* previously stores the data as the reference spectrum data. The voices to be excluded from being processed into ambiguous voices may include interjectional cries such as "hallo", cries of babies, door phone and alarm sounds, sounds of doors when opened or closed, and the like.

Like the eleventh embodiment, the terminal unit 21*x* sequentially selects the unprocessed voice data, for example, in time units of 10 milliseconds to generate target spectrum data, i.e., data indicating a spectrum component of the selected voice data. Like the eleventh embodiment, the terminal unit 21*x* then performs the determination using the correlation coefficient between the reference spectrum data and the target spectrum data.

If the correlation coefficient between the target spectrum data and any reference spectrum data exceeds a specified value, the terminal unit 21*x* directly transmits the previously selected voice data to the terminal unit 21*y*. On the other hand, the correlation coefficient between the target spectrum data and the reference spectrum data may not exceed the specified value with respect to any reference spectrum data. In such case, the terminal unit 21*x* processes the previously selected voice data into ambiguous voice by means of filtering and the like and transmits the processed data to the terminal unit 21*y*.

According to the above-mentioned process, the terminal unit 21*x* transmits voice data to the terminal unit 21*y*. Such voice data is the ambiguous voice data representing unprocessed voices only with respect to portions containing specific voices. When a specific voice is generated at the transmitting side of the communication during the ambiguous communication, the receiving party of the communication can clearly hear that voice to easily detect an abnormality in the transmitting side. Such specific voice may include, for example, the cries of a baby or the sound to close or open the door of a room where no one should be present.

There may be a case where the correlation coefficient between the reference spectrum data and the target spectrum data exceeds the specified value. In such case, for a specified time period thereafter or until the user issues an instruction, the terminal unit 21*x* may transmit unprocessed voice data to the terminal unit 21*y*. In this case, for example, the transmitting party of the communication can give a cry such as "hello" without any other operations to turn off the ambiguous communication and start the normal speech communication. If a sound to open or close the door occurs at the transmitting side of the communication where no one should be present, the ambiguous communication becomes inactive for a while. The receiving party of the communication can easily confirm an abnormality and the like at the transmitting side.

As mentioned above, the terminal unit 21*x* specifies voice data for voice portions containing voices not to be included in ambiguous voices based on the method of comparing a spectrum component of the reference voice data for the unit time with a spectrum component of the target voice data. However, the present invention is not limited thereto. Other voice recognition technologies may be used. As mentioned above, the terminal unit 21*x* processes voice data for voice portions containing a specific voice so as not to include the specific voice in ambiguous voices. Further, the terminal unit 21*x* may use a different process method. According to an alternative method, for example, the terminal unit 21*x* uses a blind sound source separation algorithm based on the independent component analysis to separate voice components not to be included in ambiguous voices from the voice data. The terminal unit 21*x* does not process the voice components not to be included in ambiguous voices, but processes the other voice components. The terminal unit 21*x* then adds these voice data together.

13. Thirteenth Embodiment

The thirteenth embodiment is similar to the above-mentioned eighth embodiment in many points. The following describes only differences between the thirteenth and eighth embodiments. According to the thirteenth embodiment, the terminal unit 21 to process voice data converts a daily life sound at the transmitting side of the communication into voice data representing a comfortable sound.

For example, let us assume that voice data is processed by the terminal unit 21*x* disposed at the transmitting side of the communication. The HD of the terminal unit 21*x* previously stores "background voice data", i.e., voice data representing sounds comfortably sensed by humans such as a tinkle of a wind-bell, the murmuring of a stream, a bird's singing, and the like. The background voice data is stored for one minute, for example. When the beginning and the end of each background voice data is concatenated for reproduction, a click sound may occur. To solve this problem, the background voice data are level-adjusted and the like by means of processes such as a crossfade.

After obtaining unprocessed voice data via the microphone and the A/D converter, the terminal unit 21*x* first uses the RAM to store the unprocessed voice data for a specified time, e.g., for one second. The terminal unit 21*x* calculates data representing a sound volume of the stored voice data, e.g., an average of absolute values for sample data contained in the voice data. The terminal unit 21*x* then sequentially selects the sample data contained in the background voice data. The terminal unit 21*x* applies a process for value adjustment to the selected sample data corresponding to the already calculated data representing a sound volume (hereafter referred to as "sound volume data"). Now, let us assume that the sound volume data ranges from 0 to 127. The terminal unit 21*x* then performs a calculation such as (sample data)×(sound volume data)×50/127. The result is used as new sample data.

The sequence of sample data calculated in this manner constitutes voice data representing sounds of a wind-bell and the like with volumes adjusted within the range of 0% to 50% in units of seconds in accordance with the sound volume data. The terminal unit 21*x* transmits the voice data generated as mentioned above to the terminal unit 21*y*. As a result, the speaker of the terminal unit 21*y* generates sounds of the wind-bell and the like with volumes corresponding to the volumes of the daily life sounds at the transmitting side of the communication. The sounds of the wind-bell and the like generated in this manner constitute ambiguous voices that transmit only information about the volumes to the transmitting side of the communication. That information belongs to the information included in the daily life sounds at the transmitting side of the communication. Further, the terminal unit 21*x* may use an alternative to the method of processing the background voice data by adjusting its volume in accordance with the volume of the daily life sound at the transmitting side of the communication. For example, the terminal unit 21*x* may adjust a pitch of the background voice data corresponding to the pitch of the daily life sound.

Instead of using the background voice data previously stored in the HD, the terminal unit 21*x* may use background voice data obtained from a server via the Internet 27. Further, the terminal unit 21*x* may realtime receive information about sounds recorded at completely different locations such as the sound of the waves and the like continuously recorded in an uninhabited island. If the terminal unit 21*x* is configured to obtain the background voice data from an external apparatus, it is possible to easily realize the ambiguous communication using the background voice data that can be reproduced for a long time or has no time limitation.

According to the thirteenth embodiment, the receiving party of the communication can comfortably use the ambiguous communication even if an undesirable noise is contained in the daily life sound at the transmitting side of the communication.

14. Fourteenth Embodiment

The fourteenth embodiment is similar to the above-mentioned eighth embodiment in many points. The following describes only differences between the fourteenth and eighth embodiments. According to the fourteenth embodiment like the thirteenth embodiment, the terminal unit 21 to process voice data converts a daily life sound at the transmitting side of the communication into voice data representing a comfortable sound. When converting voice data into ambiguous voice data, however, the fourteenth embodiment uses performance data that specifies generation of musical sounds. The following describes an example of the fourteenth embodiment using "MIDI data", i.e., performance data in compliance with the MIDI (Musical Instrument Digital Interface) standard. The performance data format is not limited to the MIDI standard.

For example, let us assume that voice data is processed by the terminal unit 21*x* disposed at the transmitting side of the communication. The HD of the terminal unit 21*x* previously stores "musical sound data", i.e., voice data representing musical sounds such as those of a harp, a handbell, and the like. The musical sound data is stored with respect to each pitch. The musical sound data are each assigned with program numbers 0 through 127 to numerically specify timbres and note numbers 0 through 127 to numerically specify pitches. The HD of the terminal unit 21*x* also stores reference spectrum data concerning each timbre of the harp, the handbell, and the like. For example, the reference spectrum data represents a spectrum component of musical sound data corresponding to middle C.

After obtaining unprocessed voice data via the microphone and the A/D converter, the terminal unit 21*x* first uses the RAM to store the unprocessed voice data for a specified time, e.g., for 10 milliseconds. The terminal unit 21*x* sequentially calculates such data representing a sound volume of the stored voice data as an average of absolute values for sample data contained in the voice data. The terminal unit 21*x* then performs differentiation and the like for a sequence of "sound volume data", i.e., data representing a previously calculated sound volume. In this manner, the terminal unit 21*x* finds "note-on timing" and "note-off timing". The note-on timing allows a value of the sound volume data to increase suddenly. The note-off timing allows a value of the sound volume data to go under a specified value. The terminal unit 21*x* specifies a corresponding velocity in the MIDI data based on the sound volume data corresponding to the note-on timing. The velocity is data that represents a sound volume with a numeric value ranging from 0 to 127. When the unprocessed voice data shows quantifying bit number 8, for example, the sound volume data takes a value ranging from 0 to 127 to indicate an average of the absolute values for the sample data. The terminal unit 21*x* directly uses the value of the sound volume data for the velocity.

The terminal unit 21*x* then selects part of the unprocessed voice data corresponding to an interval between the note-on timing and the note-off timing. The terminal unit 21$x$ calculates spectrum components of the selected voice data. The terminal unit 21$x$ specifies a note number corresponding to the frequency causing a maximum amplitude value in the calculated spectrum components. For example, let us assume that a frequency of approximate 440 kHz causes a maximum amplitude value in the calculated spectrum components. In such case, the terminal unit 21$x$ finds a note number 69 representing middle A.

The HD of the terminal unit 21$x$ stores the reference spectrum data. There is the similarity between the reference spectrum data and the previously calculated spectrum component concerning the voice data between the note-on timing and the note-off timing. The terminal unit 21$x$ calculates, for example, the correlation coefficient as an index indicative of that similarity for each of the reference spectrum data. The terminal unit 21$x$ specifies a program number for the musical sound corresponding to the reference spectrum data causing a correlation coefficient calculated.

The terminal unit 21$x$ uses the velocity and the note number specified as mentioned above to generate a note-on message, i.e., MIDI data to instruct generation of a musical sound. Further, the terminal unit 21$x$ uses the program number specified as mentioned above to generate a program change message, i.e., MIDI data to specify a timbre.

The musical sound data is associated with the program number contained in the program change message generated as mentioned above and with the note number contained in the note-on message generated as mentioned above. The terminal unit 21$x$ selects such musical sound data from the HD. The terminal unit 21$x$ adjusts a sound volume in accordance with the velocity contained in the note-on message. That is to say, the terminal unit 21$x$ then performs a calculation such as (sample data)×(velocity)×50/127 for each sample data contained in the selected musical sound data. The result is used as new sample data.

The terminal unit 21$x$ obtains a sequence of sample data according to the above-mentioned process and transmits the sequence as voice data to the terminal unit 21$y$. As a result, the speaker of the terminal unit 21$y$ generates musical sounds with different timbres, volumes, and pitches at various timings in accordance with changes in the daily life sounds at the transmitting side of the communication. The musical sounds generated in this manner constitute ambiguous voices that transmit only information about the volumes, pitches, and sound qualities to the receiving side of the communication. That information belongs to the information included in the daily life sounds at the transmitting side of the communication.

There may be alternatives to the above-mentioned methods of selecting musical sound data to be transmitted from the terminal unit 21$x$ to the terminal unit 21$y$, determining transmission timings of musical sounds, and adjusting volumes thereof. For example, the terminal unit 21$x$ may transmit musical sound data to the terminal unit 21$y$ at a timing when the daily life sound's pitch suddenly changes. Moreover, the terminal unit 21$x$ may transmit musical sound data with timbres varying with volumes to the terminal unit 21$y$.

According to the fourteenth embodiment like the thirteenth embodiment, the receiving party of the communication can comfortably use the ambiguous communication even if an undesirable noise is contained in the daily life sound at the transmitting side of the communication.

As another embodiment of the fourteenth embodiment, the terminal unit 21$y$ at the receiving side of the communication may store musical sound data in the HD. The terminal unit 21$y$ may reproduce the musical sound data based on performance data generated by the terminal unit 21$x$ at the transmitting side of the communication. In this case, only the performance data is transmitted from the terminal unit 21$x$ to the terminal unit 21$y$, decreasing the amount of data exchanged between the terminal units 21$x$ and 21$y$.

15. Fifteenth Embodiment

The fifteenth embodiment is similar to the above-mentioned eighth embodiment in many points. The following describes only differences between the fifteenth and eighth embodiments. According to the fifteenth embodiment, no voice data is processed in the terminal units 21 disposed at the transmitting side and the receiving side of the communication. A voice processing server in the Internet 27 processes voice data.

Figure 9:
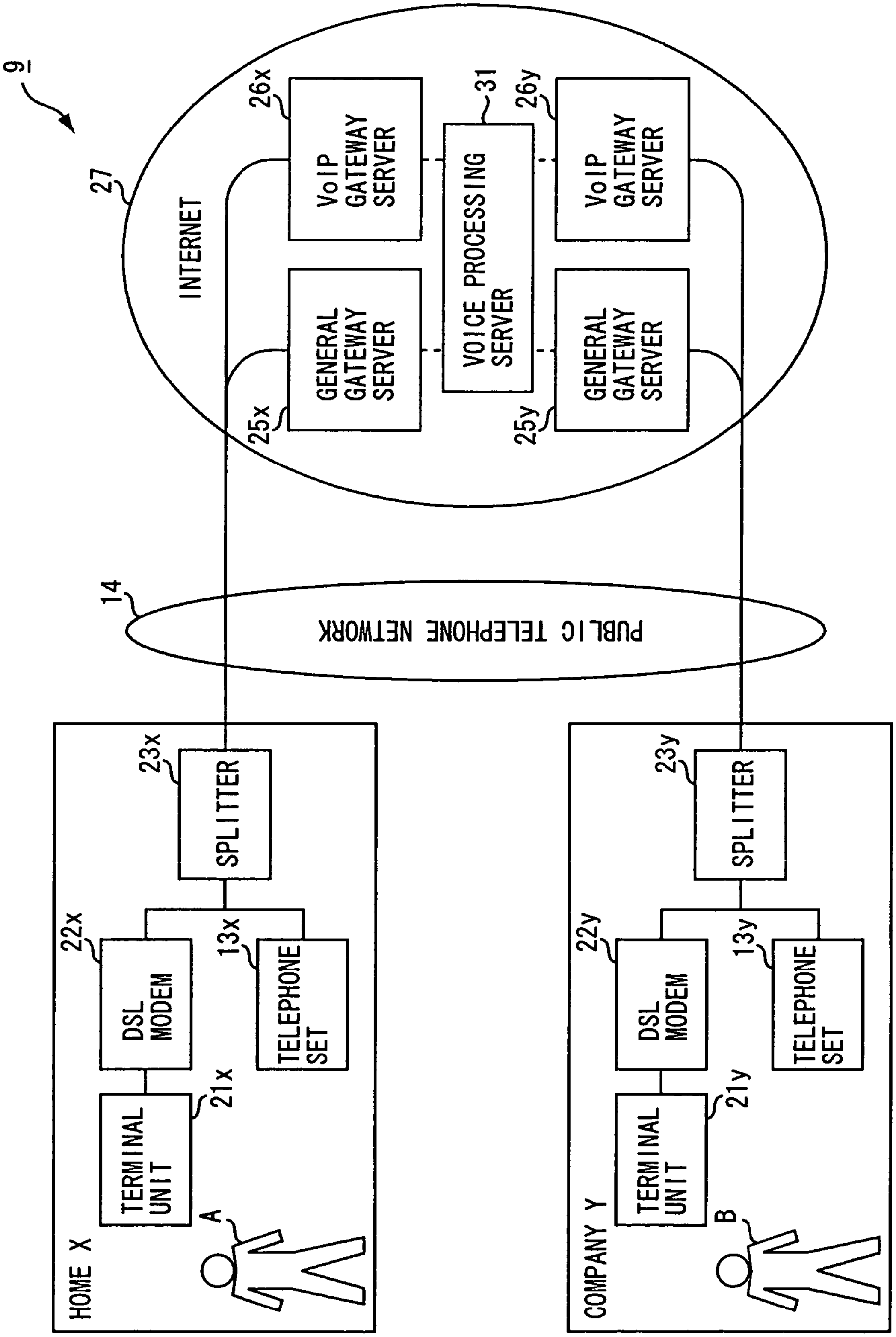
FIG. 9 shows a configuration of the communication system according to the ninth embodiment of the present invention.

FIG. 9 shows a communication system 9 according to the fifteenth embodiment. The communication system 9 comprises a voice processing server 31 in addition to the components of the communication system 8 according to the eighth embodiment. The voice processing server 31 is provided between the set of the general gateway server 25$x$ and the VoIP gateway server 26$x$ and the set of the general gateway server 25$y$ and the VoIP gateway server 26$y$.

The voice processing server 31 can process voice data and exchange packet data between the general gateway server 25 and the VoIP gateway server 26. The voice processing server 31 can be also realized by allowing a general-purpose computer to execute processes according to a specific program. The following description assumes that the voice processing server 31 is realized by allowing the general-purpose computer to execute a program for the voice processing server in the communication system 9. The general-purpose computer here comprises a CPU, a DSP, ROM, RAM, an HD, a display section, an operation section, and an NW input/output section.

The terminal unit 21$x$ obtains voice data via the microphone and the A/D converter and transmits the voice data unprocessed to the terminal unit 21$y$. The VoIP gateway server 26$x$ receives the voice data transmitted from the terminal unit 21$x$. The voice data is then transferred to the voice processing server 31. The voice processing server 31 receives the voice data transferred from the VoIP gateway server 26$x$. The voice processing server 31 then generates ambiguous voice data by performing a process similar to the voice data process performed by the terminal unit 21$x$ according to the above-mentioned eighth embodiment. The voice processing server 31 transmits the generated ambiguous voice data to the terminal unit 21$y$. The ambiguous voice data transmitted from the voice processing server 31 is then transmitted to the terminal unit 21$y$ via the VoIP gateway server 26$y$. As a result, the speaker of the terminal unit 21$y$ generates the ambiguous voice.

According to the fifteenth embodiment, a user can use the ambiguous communication by using the terminal units normally used for the voice communication. In this case, the terminal units need no special modifications.

What is claimed is:

1. A communication system for monitoring sounds of a first place from a second place remote from the first place through a communication line, the communication system comprising:

a first communication apparatus disposed at the first place and equipped with an input section configured to collect various sounds generated at the first place containing a first type of sound information that should be monitored and a second type of sound information, and to convert the collected sounds into a signal capable of conveying the sound information, and a transmission section configured to transmit the signal to the second place through the communication line;

a second communication apparatus disposed at the second place and equipped with a reception section configured to received the signal transmitted from the first place, and an output section configured to reproduce sounds; and a signal processing section disposed at the first place or the second place, or at another location interposed in the communication line therebetween, and configured to process the signal by masking or modifying the second type of sound information to create a processed signal that obscures the second type of sound information when produced, wherein the output section of the second place produces sounds from the processed signal to reproduce the first type of sound information and to produce the obscured second type of sound information, and wherein the input section collects the various sounds including a physical noise sound associated with activity to be monitored as the first type of sound information, and a vocal sound incidentally spoken as the second type of sound information.

2. A communication apparatus disposed at a target place for monitoring sounds at a remote place through a communication line, the communication apparatus comprising:

an input section configured to collect various sounds generated at the target place, the collected sounds containing a first type of sound information that should be monitored and a second type of sound information, and to convert the collected sounds into a signal capable of conveying the sound information;

a signal processing section configured to process the signal to mask or modify the second type of sound information and create a processed signal that obscures the second type of sound information when produced; and a transmission section configured to transmit the processed signal to the remote place, wherein the remote place is configured to produce sounds from the processed signal to reproduce the first type of sound information and to produce the obscured second type of sound information, and wherein the input section collects the various sounds including a physical noise sound associated with activity to be monitored as the first type of sound information, and a vocal sound incidentally spoken at the target place as the second type of sound information.

3. The communication apparatus according to claim 2, further comprising an operation section configured to input instruction information to specify the second type of sound information that should be obscured, so that the signal processing section processes the signal based on the instruction information to alter the specified second type of sound information to the obscured second type of sound information.

4. The communication apparatus according to claim 2, further comprising:

a memory for storing reference sound information representing reference sounds, wherein the signal processing section carries out a calculation process of calculating an index representing similarity between characteristics of the collected sounds conveyed by the signal and characteristics of the reference sounds represented by the stored reference sound information, a determination process of determining whether or not the collected sounds are similar to the reference sounds based on the calculated index, and a control process of controlling at least one of start, stop, or manner of creating the obscured second type of sound information according to results of the determination process.

5. The communication apparatus according to claim 2, wherein the signal processing section has a filter configured to filter the signal to remove or reduce a particular frequency component of the second type of sound information to create the obscured second type of sound information.

6. The communication apparatus according to claim 2, wherein the transmission section transmits the signal through the communication line having a limited frequency pass band, and the signal processing section includes a pitch shifter for shifting a pitch of the collected sounds so as to fit a frequency of the signal into the limited frequency pass band of the communication line, wherein the first type of sound information is transmittable to the remote place for monitoring.

7. The communication apparatus according to claim 2, further comprising an operation section operable for inputting instruction information to start creating the obscured second type of sound information, so that the signal processing section starts creating the obscured second type of sound information when the instruction information is input.

8. The communication apparatus according to claim 2, further comprising an operation section operable for inputting instruction information to stop creating the obscured second type sound information, so that the signal processing section stops creating the obscured second type of sound information when the instruction information is input.

9. The communication apparatus according to claim 2, further comprising a reception section that receives instruction information from the remote place through the communication line, so that the signal processing section starts or stop creating the obscured second type of sound information in response to the instruction information.

10. The communication apparatus according to claim 2, further comprising a sensor section that senses change of a physical quantity at the target place, the physical quantity representing a state of the target place and being selected from electricity, light, temperature, sound and pressure, and that provides instruction information when the change of the physical quantity is sensed, so that the signal processing section starts or stops creating the obscured second type of sound information in response to the instruction information.

11. The communication apparatus according to claim 2, further comprising a sensor section that senses change of a physical quantity observed at the target place, the physical quantity being selected from electricity, light, temperature, sound and pressure, and that provides instruction information when the change of the physical quantity is sensed, so that the transmission section starts or stops transmitting the signal in response to the instruction information.

12. The communication apparatus according to claim 2, wherein the input section samples the collected sounds at a given sampling frequency and quantizes the sampled sounds to generate the signal in the form of digital sound data, and the signal processing section processes the digital sound data to create the obscured second type of sound information by lowering the sampling frequency of the digital sound data.

13. The communication apparatus according to claim 2, wherein the input section samples the collected sounds and quantizes the sampled sounds by a given quantization bit number to generate the signal in the form of digital sound data, and the signal processing section processes the digital sound data to create the obscured second type of sound information by reducing the quantization bit number.

14. The communication apparatus according to claim 2, further comprising a measurement section configured to measure at least one of a volume, a pitch, or a tone of the collected sounds, so that the signal processing section creates the obscured second type of sound information according to the measured volume, pitch, or tone of the collected sounds.

15. A communication method of monitoring sounds of a first place from a second place remote from the first place through a communication line using a communication system having a first communication apparatus disposed at the first place, a second communication apparatus disposed at the second place, and a signal processing section disposed at the first place or the second place, or another location interposed in the communication line therebetween, the first communication apparatus having an input section, and the second communication apparatus having a reception section, and an output section, the communication method comprising:

an input step of collecting various sounds generated at the first place containing a first type of sound information that should be monitored and a second type of sound information, and converting the collected sounds into a signal capable of conveying the sound information using the input section of the first communication apparatus;

a transmission step of transmitting the signal converted by the first communication apparatus to the second place through the communication line;

a reception step of receiving the signal transmitted from the first place using the reception section of the second communication apparatus;

an output step of reproducing sounds from the received signal using the output section of the second communication apparatus; and a signal processing step of processing the converted signal at either the first place or the second place, or the another location using the signal processing section by masking or modifying the second type of sound information to create a processed signal that obscures the second type of sound information when produced by the output section, wherein the output step produces sounds at the second place from, using the output section, the processed signal to reproduce the first type of sound information collected from the first place and to produce the obscured second type of sound information, and wherein the input step collects the various sounds including a physical noise sound associated with activity to be monitored as the first type of sound information, and a vocal sound incidentally spoken as the second type of sound information.

16. A method of remotely monitoring sounds at a remote place through a communication line using a communication apparatus disposed as a target place, the communication apparatus having an input section, a signal processing section, and a transmission section, the method comprising:

an input step of collecting various sounds generated at the target place, the collected sounds containing a first type of sound information that should be monitored and a second type of sound information, and converting the collected sounds into a signal capable of conveying the sound information using the input section;

a signal processing step of processing the signal by masking or modifying the second type of sound information to create a processed signal that obscures the second type of sound information when produced; and a transmission step of transmitting the processed signal to the remote place using the transmission section, an output step of producing sounds from the processed signal to reproduce the first type of sound information collected from the target place and to produce the obscured second type of sound information, and wherein the input step collects the various sounds including a physical noise sound associated with activity to be monitored as the first type of sound information, and a vocal sound incidentally spoken at the target place as the second type of sound information.

17. A non-transitory computer-readable medium storing a computer program executable by a communication apparatus for remotely monitoring sounds at a target place from a remote place through a communication line, the computer program including instructions for:

collecting various sounds generated at the target place, the collected sounds containing a first type of sound information that should be monitored and a second type of sound information, and converting the collected sounds into a signal capable of conveying the sound information;

processing the signal by masking or modifying the second type of sound information to create a processed signal that obscures the second type of sound information when produced;

transmitting the processed signal to the remote place; and outputting sounds from the processed signal at the remote place to reproduce the first type of sound information collected from the target place and to produce obscured second type of sound information, and wherein the collecting instruction collects the various sounds including a physical noise sound associated with activity to be monitored as the first type of sound information, and a vocal sound as the second type of sound information.

18. The communication system according to claim 1, wherein the signal processing section creates the obscured second type of sound information by converting the second type of sound information into music performance information that enables the output section to reproduce musical performance sounds from the received signal.

* * * * *